US012027279B2

(12) United States Patent
Singh et al.

(10) Patent No.: US 12,027,279 B2
(45) Date of Patent: Jul. 2, 2024

(54) CASK WITH VENTILATION CONTROL FOR SPENT NUCLEAR FUEL STORAGE

(71) Applicant: HOLTEC INTERNATIONAL, Camden, NJ (US)

(72) Inventors: Krishna P. Singh, Jupiter, FL (US); Frederick R. Bidrawn, Haddonfield, NJ (US)

(73) Assignee: HOLTEC INTERNATIONAL

( * ) Notice: Subject to any disclaimer, the term of this patent is extended or adjusted under 35 U.S.C. 154(b) by 365 days.

(21) Appl. No.: 17/357,068

(22) Filed: Jun. 24, 2021

(65) Prior Publication Data

US 2021/0407697 A1 Dec. 30, 2021

Related U.S. Application Data

(60) Provisional application No. 63/043,812, filed on Jun. 25, 2020.

(51) Int. Cl.
*G21F 5/005* (2006.01)
*G21F 5/10* (2006.01)
*G21F 9/34* (2006.01)

(52) U.S. Cl.
CPC ................ *G21F 5/005* (2013.01); *G21F 5/10* (2013.01); *G21F 9/34* (2013.01)

(58) Field of Classification Search
CPC ............... G21F 5/005; G21F 5/10; G21F 9/34
See application file for complete search history.

(56) References Cited

U.S. PATENT DOCUMENTS 4,634,875 A 1/1987 Kugeler et al.
8,798,224 B2 8/2014 Singh
8,929,504 B2 1/2015 Singh et al.
9,105,365 B2 * 8/2015 Singh ........................ G21F 5/10
(Continued)

FOREIGN PATENT DOCUMENTS

WO WO2021/262967 12/2021

OTHER PUBLICATIONS

Final Safety Analysis Report (FSAR for Holtec International's HI-STORM 100 System. https://www.nrc.gov/docs/ML1010/ML101090397.pdf, pp. 1-74, 148-202. (Year: 2010).*
(Continued)

*Primary Examiner* — Lily C Garner
(74) *Attorney, Agent, or Firm* — The Belles Group, P.C.

(57) ABSTRACT

A natural passively cooled ventilated cask includes a cavity which holds a canister containing heat and radiation emitting spent nuclear fuel assemblies. Cooling air inlet ducts draw ambient cooling air inwards into a lower portion of the cavity. The air heated by the canister flows upwards along the canister and is discharged from at least one air outlet duct formed by the cask lid to atmosphere via natural convective thermo-siphon flow. The air inlet ducts or at least one outlet duct in one embodiment may be fitted with an adjustable shutter plate which allows the flowrate of air entering the cask to be increased or decreased to maintain a predetermined canister maximum temperature limit selected in part to prevent the onset of stress corrosion cracking of the canister welds. Other embodiments may use a fixed orifice plate replaceable over time to maintain the minimum temperature.

12 Claims, 29 Drawing Sheets

(56) References Cited

U.S. PATENT DOCUMENTS

| | | | | |
|---|---|---|---|---|
| 10,878,973 | B2 | 12/2020 | Singh et al. | |
| 2006/0243602 | A1 | 11/2006 | Andresen et al. | |
| 2015/0072610 | A1* | 3/2015 | Coles | F24F 13/12<br>454/324 |
| 2017/0125132 | A1 | 5/2017 | Takeda | |

OTHER PUBLICATIONS

Final Safety Analysis Report (FSAR for Holtec International's HI-STORM 100 System. https://www.nrc.gov/docs/ML1010/ML101090397.pdf, pp. 1-74, 148-202. (Year: 2010) (Year: 2010).*

* cited by examiner

CASK WITH VENTILATION CONTROL FOR SPENT NUCLEAR FUEL STORAGE

CROSS-REFERENCE TO RELATED APPLICATIONS

The present application claims the benefit of U.S. Provisional Application No. 63/043,812 filed Jun. 25, 2020; which is incorporated herein by reference in its entirety.

BACKGROUND

The present invention relates generally to ventilated overpacks or cask used for dry storage and/or transport of high level nuclear waste from nuclear power generating plants or other nuclear facilities, and more particularly to such a cask with controllable ventilation air flow.

In the operation of nuclear reactors, the nuclear energy source is typically in the form of a plurality of hollow Zircaloy tubes each filled with enriched uranium pellets, which are collectively arranged in assemblages referred to as fuel assemblies. When the energy in the fuel assembly has been depleted to a certain predetermined level, the fuel assembly is removed from the nuclear reactor and referred to as used or spent nuclear fuel ("SNF"). The standard structure used to package or store the SNF assemblies discharged from light water reactors for off-site shipment or on-site dry storage is an all-welded stainless steel container. Such containers are well known and may be variously referred to as multi-purpose canisters (MPCs) such as those available from Holtec International of Camden, New Jersey, or dry storage canisters (DSCs).

Regardless of their name, these SNF canisters are characterized by a relatively thin-walled stainless shell to effectively transmit heat emitted by the decaying the SNF assemblies across the canister's wall boundary. The stainless steel shell has several full through-thickness continuous seam welds, including longitudinal seam welds and girth welds such as those that connect the shell to the top and bottom end closure plates. A fuel basket is typically arranged inside a metallic storage canister which defines an array of prismatic-shaped storage cells each of which is sized to hold a single fuel assembly, which in turn comprises a plurality of individual spent nuclear fuel rods.

A single heat-emitting canister is in turn stored and enclosed inside its own outer vertically ventilated module referred to as an overpack or cask. The casks comprise heavy radiation shielding which block gamma and neutron radiation emitted from the SNF assemblies which passes through the canister shell and end plates. The ventilated casks are used for safe transport and/or storage of the multiple spent fuel assemblies within the inner fuel basket.

In addition to emitting neutron and gamma radiation) requiring protective shielding, the highly radioactive SNF in the fuel assemblies still produces considerable heat which must be dissipated to avoid damage to the fuel assemblies stored in the canister. Ventilated casks use available ambient ventilation air to cool the canister and remove the heat emitted therefrom to protect the fuel assembly. Typically, ventilated casks have air inlet vents at bottom and air outlet vents at top. Ambient cooling air is drawn into the bottom of the cask interior cavity which holds the canisters, flows upward via natural thermal-siphon effect between the cask and canister as the air is heated by the canister, and the heated air is rejected back to the ambient environment through the air outlet vents at top.

Classical metallurgy teaches that stainless steel becomes vulnerable to stress corrosion cracking (SCC) if the material is subject to a tensile stress field and the environment has high humidity and halide species; a condition common to many marine environments. In canisters containing pressurized helium blanketing gas, the majority of which do for heat rejection purposes, tensile stress is present over the entire canister shell body. Thus, on-site canister storage facilities, often called Independent Spent Fuel Storage Installations (ISFSIs), located at the seacoast are especially vulnerable to SCC damage if subjected to prolonged exposure to the site's ambient environment. Because the relative humidity of air decreases with increasing temperature, the entering air has the highest relative humidity and the exiting air has the lowest relative humidity. Therefore, it is the bottom region of the canister, closest to the air inlets, where its wall is exposed to the most adverse conditions with the highest humidity and lowest temperature. Consequently, the threat of SCC is most acute in this lower region of the canister where the air is at its coldest and has maximum relative humidity. Under a sufficiently prolonged service condition, there is a risk of the bottom region of the canister developing SCC over time. The weld seams and the adjacent heat affected zones are particularly vulnerable to SCC.

Notably, the extent of the canister's lower region that is vulnerable to SCC increases as the decay heat generated by the contained fuel declines monotonically with time resulting in the canister wall concomitantly becoming gradually cooler. Thus, threat of SCC grows over time as the canister ages. Prior ventilated casks typically have no provisions to allow adjustment and control over the amount of ventilation air flow through the casks over time to reflect the need to keep the canister warmer at a desired temperature as its heat emission drops.

Accordingly, a need exists from an improved cask with user adjustable and controllable ventilation air flow to accommodate the changing temperature conditions of the canister over time for protection against SCC.

BRIEF SUMMARY

This disclosure addresses the challenge of protecting the SNF canister from stress corrosion cracking (SCC), particularly its shell wall and weld seams, in nuclear waste fuel or other high level radioactive waste material storage site locations where the canister may be exposed to a marine environment or other environment with similarly high halide concentrations conducive to the onset of SCC.

A radiation-shielded ventilated cask for storing the canister is provided which comprises a natural ambient air ventilation system configured to provide a user adjustable and variable ventilation airflow rate. The airflow rate may be adjusted over time as needed to mitigate the threat of SCC resulting from the reduction in canister heat load (emission) over time. The variable ventilation airflow rate allows the amount of ambient air inducted into the cask interior cavity via the natural convection thermo-siphon effect to be decreased over time to keep pace with the declining heat emitted by the canister. Advantageously, the greatest threat of SCC at the lower/bottom region of the canister as previously described herein can be mitigated by maintaining the temperature of the canister at or near a canister maximum temperature limit over the life of the canister to the extent possible. The ventilation airflow rate may therefore be readily adjusted from time to time as needed to operate at that threshold temperature. In addition, the airflow rate may be adjusted seasonally if needed due to changing ambient air conditions (e.g., temperature and humidity) to maintain the foregoing desired canister maximum temperature limit.

In one embodiment, the ambient ventilation air inlet or outlet vents may be fitted with adjustable shutter plates configured to regulate the airflow rate into and through the canister. The shutter plates act as adjustable orifices to increase or decrease the vent open area, thereby correspondingly increasing or decreasing the airflow rate. In other embodiments, a fixed flow restrictor such as an orifice plate may be fitted to the air outlet of the cask which may be located in its lid.

In one aspect, a passively ventilated nuclear fuel storage cask comprises: an elongated cask body defining a top end, a bottom end, a sidewall, and an internal cavity extending between the ends along a longitudinal axis, the internal cavity being configured for holding a nuclear fuel storage canister; a plurality of cooling air inlet ducts spaced circumferentially apart around the body, the inlet ducts each forming a radial air inlet passageway fluidly coupling ambient atmosphere with a lower portion of the internal cavity; at least one cooling air outlet ducts disposed at the top end of the cask body, the at least one outlet duct forming an air outlet passageway fluidly connecting ambient atmosphere with an upper portion of the internal cavity; and a vertically adjustable shutter plate coupled to each the air inlet ducts, the shutter plate defining a flow opening area configured to throttle an inflow of cooling air through the internal cavity of the cask. The shutter plates are vertically adjustable and movable in position such as via sliding on the cask to vary the flow opening area to increase or decrease the inflow of cooling air.

In another aspect, a method for operating the foregoing passively ventilated nuclear fuel storage system comprises: providing a ventilated cask comprising an internal cavity and plurality of air inlet ducts in fluid communication with the cavity; inserting a canister containing spent nuclear fuel in the internal cavity of a cask; placing shutter plates associated with each of the air inlet ducts in a first vertical position, the first vertical position defining a first flow opening area; storing the canister in the cask for a first period of time; moving the shutter plates to a second vertical position, the second vertical position being associated with a second flow opening area different than the first flow opening area; wherein the first and second flow opening areas regulates an amount of air which can be drawn into the internal cavity of the cask heated by the canister via natural convective flow.

In another aspect, a passively ventilated nuclear fuel storage cask comprises: an elongated cask body configured for mounting a majority of its length below grade, the cask body comprising an outer shell and an inner shell defining an internal cavity extending along a longitudinal axis, the internal cavity being configured for holding a nuclear fuel storage canister; a lid attached to a top end of the cask body, the lid configured for above grade placement; a natural convective ventilation system comprising: a vertical annular downcomer formed between the inner and outer shells, the annular downcomer being in fluid communication with a lower portion of the internal cavity; a plurality of cooling air inlet ducts formed through the lid, the air inlet ducts each in fluid communication with the annular downcomer to fluidly couple the lower portion of the internal cavity with ambient atmosphere; a cooling air outlet duct formed through the lid; and a flow restrictor disposed at one end of the air outlet duct, the flow restrictor having a configuration selectable to regulate an amount of ambient air which flows through the internal cavity of the cask. The flow restrictor may be an orifice plate comprising a plurality of orifice openings.

In another aspect, a method for operating the foregoing passively ventilated nuclear fuel storage system comprises: inserting a canister containing spent nuclear fuel in an internal cavity of a cask; attaching a lid on the cask, the lid comprising an air outlet duct including a first orifice plate having a first open area, the outlet duct in fluid communication with the internal cavity of the cask; storing the canister in the cask for a first period of time; removing the first orifice plate from the lid; and installing a second orifice plate in the lid for a second period of time, the second orifice plate having a second open area different than the first open area.

In another aspect, a passively ventilated nuclear fuel storage system comprises: a storage site comprising embedment material having a top surface defining grade; a vertically elongated cask embedded in the embedment material for a majority of its length below grade, the cask comprising an outer shell and an inner shell defining an internal cavity extending along a longitudinal axis; a nuclear fuel storage canister disposed in the internal cavity of the cask below grade, the canister containing radioactive waste material; a lid attached to a top end of the cask body above grade, the lid configured for above grade placement; a natural convective ventilation system comprising: a vertical annular downcomer formed between the inner and outer shells, the annular downcomer being in fluid communication with a lower portion of the internal cavity; a plurality of cooling air inlet ducts formed through the lid, the air inlet ducts each in fluid communication with the annular downcomer to fluidly couple the lower portion of the internal cavity with ambient atmosphere; a cooling air outlet duct formed through the lid; and an orifice plate disposed at one end of the air outlet duct, the orifice plate having a configuration selectable to regulate an amount of ambient air which flows through the internal cavity of the cask. Heat emitted by the canister draws ambient cooling air through the air inlet ducts and annular downcomer into the internal cavity via natural convective thermo-siphon flow where the air is heated, and the heated air rises in the internal cavity and is discharged back to atmosphere through the air outlet duct in the lid.

BRIEF DESCRIPTION OF THE DRAWINGS

The present invention will become more fully understood from the detailed description and the accompanying drawings, wherein like elements are labeled similarly and in which.

Figure 1:
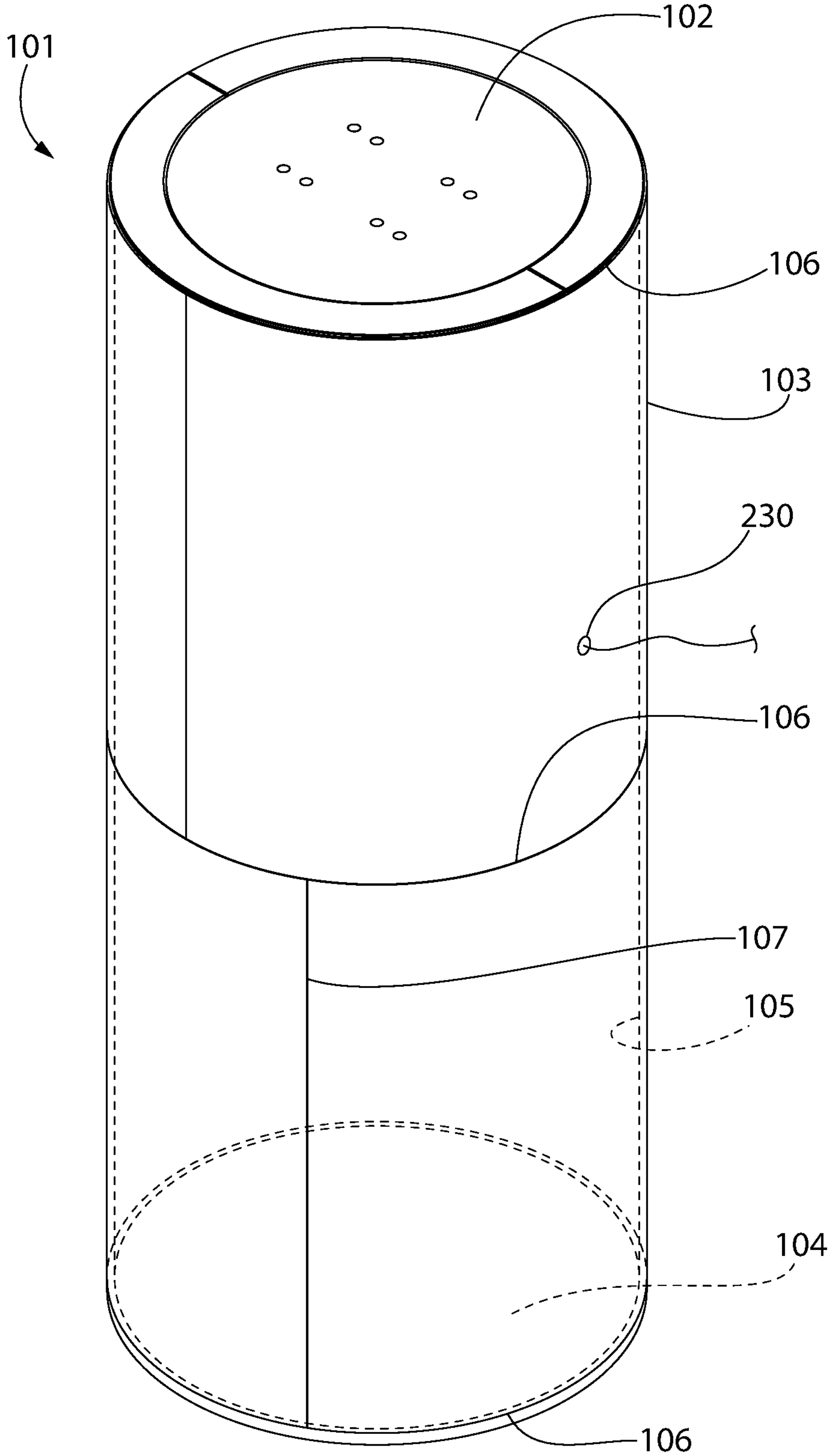
FIG. 1 is a perspective view of a fuel storage canister for storing high level nuclear radioactive waste material such as spent nuclear fuel.
Figure 2:
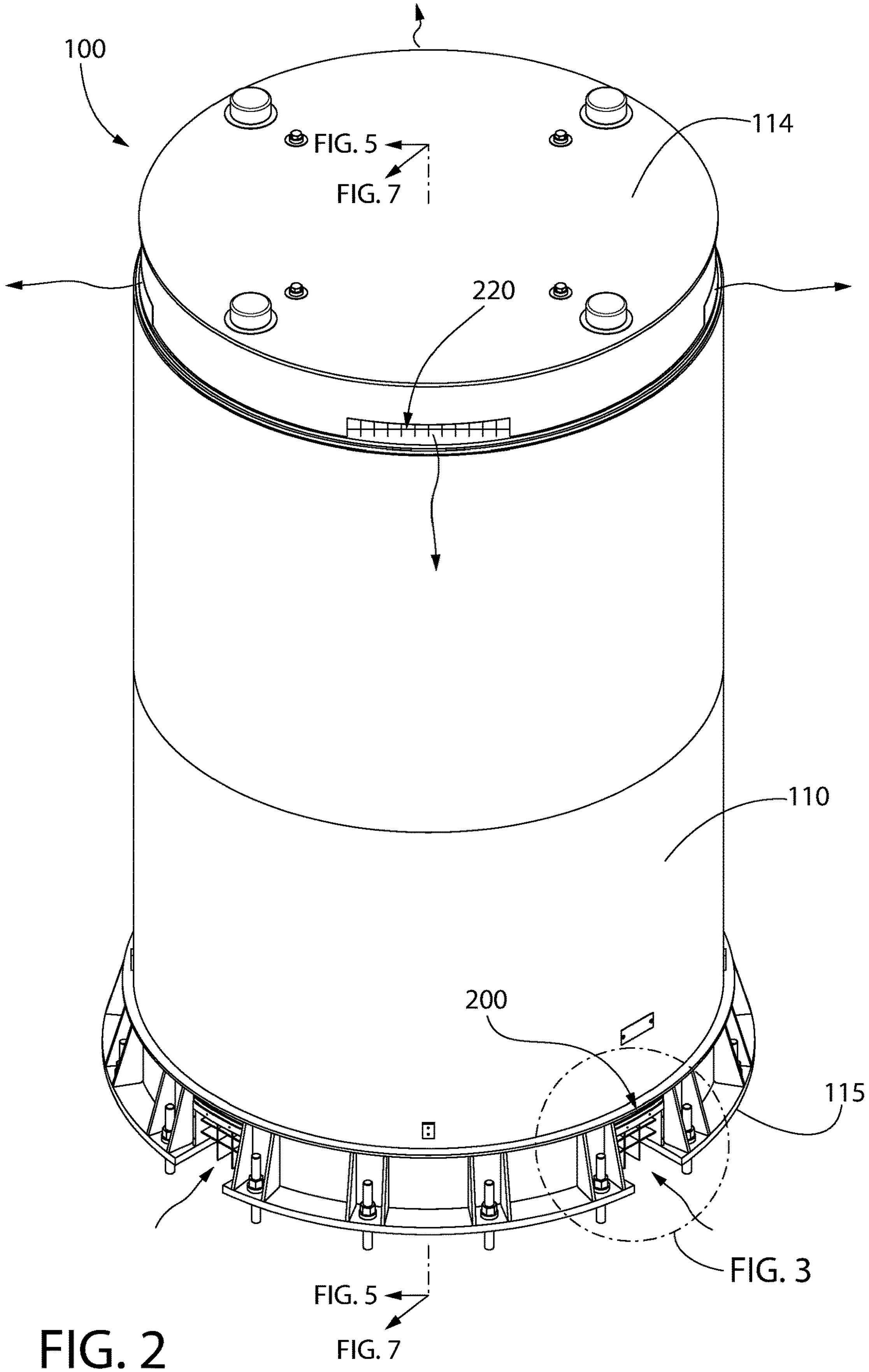
FIG. 2 is a top perspective view of an above-grade passively cooled and ventilated cask according to the present disclosure for storing the canister.

All drawings are schematic and not necessarily to scale. Features shown numbered in certain figures are the same features which may appear un-numbered in other figures unless noted otherwise herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Above Grade Ventilated Nuclear Fuel Storage Cask

FIGS. 1-15 depict various aspects of a nuclear fuel storage system generally comprising a first embodiment of a passively cooled and naturally ventilated outer storage module or cask 100. Cask 100 is constructed for above grade placement such as on a concrete slab. The cask has an internal cross-sectional area configured to hold only a single spent nuclear fuel (SNF) canister 101 loaded with SNF assemblies (not shown) emitting radiation and substantial amounts of decay heat.

Canister 101 is a vertically elongated and hermetically sealed (i.e. gas tight) vessel in one embodiment comprising cylindrical shell 103, bottom closure plate 104 affixed to a bottom end of the shell, and a lid coupled to a top end of the shell. The lid and bottom closure plate may be hermetically seal welded to the shell via circumferentially continuous girth seal welds 106 at the weld seams. Shell 103 may be formed one or more rolled metal plate segments **103*a* joined by longitudinal seal welds 107 at the weld seams. A continuous circumferential girth seal weld 106 may be used to hermetically join adjacent vertically stacked shell segments together. An interior cavity 105** is defined within the shell which is configured for holding the SNF fuel assemblies. The canister (shell(s), lid, and bottom closure plate) may be made of stainless steel in one embodiment.

Cask 100 may be a heavily radiation-shielded double-walled vessel in one embodiment including an elongated cask body 110 formed by a cylindrical outer shell 111 and inner shell 112, and radiation shielding material 113 disposed in annular space formed therebetween. The shells 111, 112 and shielding material collectively define the sidewall of the cask. The inner and outer shells are concentrically arranged relative to each other as shown. In one embodiment, the shielding material 113 may comprise a concrete mass or liner for neutron and gamma radiation blocking. Other radiation shielding materials may be used in addition to or instead of concrete including lead for gamma radiation shielding, boron containing materials for neutron blocking (e.g. Metamic® or others), steel, and/or others shielding material typically used for such purposes in the art. Inner shell 112 defines an interior or internal surface **112*a* and outer shell 111 defines an exterior or external surface 111*a* of the cask. Surfaces 111*a*, 112*a* formed by the shells may correspondingly be cylindrical and arcuately curved in one embodiment. The cask further includes a top end 119 defines by the upper end of the cask body 110 and bottom end 120**.

The passively cooled storage cask 100 may be vertically elongated and oriented as shown in the illustrated embodiment; however, other orientations such as horizontal may be used which include the features described herein. The inner and outer shells 112, 111 may be formed of a suitable metallic material, such as without limitation steel (e.g. carbon or stainless steel). If carbon steel is used at least the exterior surface 111*a* of the cask may be epoxy painted/coated for corrosion protection. The metal shells 111, 112 may each have representative thickness of about ¾ inches as one non-limiting example; however, other suitable thicknesses may be used.

Cask 100 comprises a vertically-extending internal cavity 121 which extends along a centerline or longitudinal axis LA defined by the vertically elongated cask. Cavity 121 may be of cylindrical configuration in one embodiment with a circular cross-sectional shape; however, other shaped cavities with corresponding cross-sectional shapes may be used including polygonal shapes and other non-polygonal shapes (e.g. rectilinear, hexagon, octagonal, etc.).

A metal baseplate 115 may be seal welded to the inner and outer shells 112, 111 at the bottom end 120 of cask 100 to close cavity 121 which opposes the ingress of water. Structurally, this forms a rigid self-supporting assemblage or structure which can be fabricated in the shop, and then transported to the desired SNF storage site and handled by hoists/cranes and/or cask crawlers for loading the SNF canister into the cask. Baseplate 115 may have a flat and circular in one non-limiting configuration as shown. Baseplate 115 may be structurally reinforced and stiffened by a plurality of circumferentially spaced apart angled gusset plates 115*b* welded to the top surface of the baseplate and lower exterior surface 111*a* of outer shell 111.

Baseplate 121 is configured for placement on a flat support surface S and rigidly anchoring the cask thereto. In one embodiment, the support surface S may preferably be defined by the flat top surface of a concrete support pad S1 which provides additional radiation shielding in the vertical downwards direction. A plurality of circumferentially spaced apart fasteners 124 embedded in concrete support pad S1 and arranged in a bolt circle may be used to anchor the baseplate and cask in place.

Baseplate 120 may be made of a similar metallic material as the shells 111, 112 (e.g., steel or stainless steel). In one embodiment, baseplate 115 may be about 3 inches thick. The bottom surface of baseplate 115 in one embodiment defines the bottom end 120 of the cask 100.

In one embodiment, a cylindrical support pedestal 116 may be rigidly affixed such as via welding to the top surface 115*a* of baseplate 115. Pedestal 116 is configured to support and elevate the canister 101 above the baseplate in some aspects. In another aspect, pedestal 116 is designed to provide radiation shielding for the bottom of the cask 100 at the lower of the internal cavity 121 when the radiation emitting canister 101 is loaded in the cask. Accordingly, pedestal 116 may be a thick and composite structure comprised of radiation shielding material including concrete fill 116*a* and a vertical stack of steel plates 116*b* thereon. The shielding is particularly important when the combination cask and canister are transported at the nuclear facility site before final placement at the storage location on the concrete support pad S1.

Figure 3:
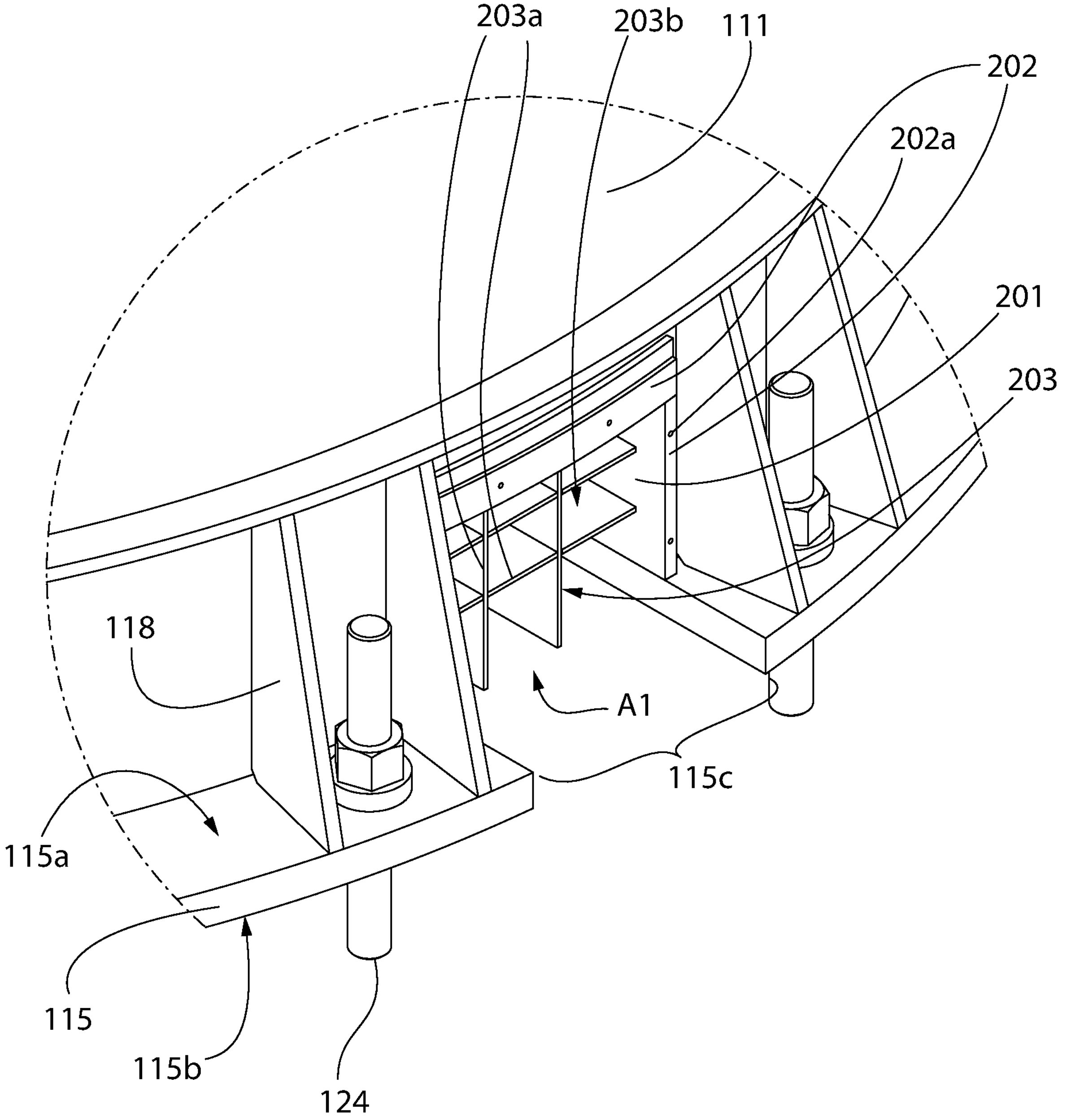
FIG. 3 is an enlarged detail taken therefrom.
Figure 4:
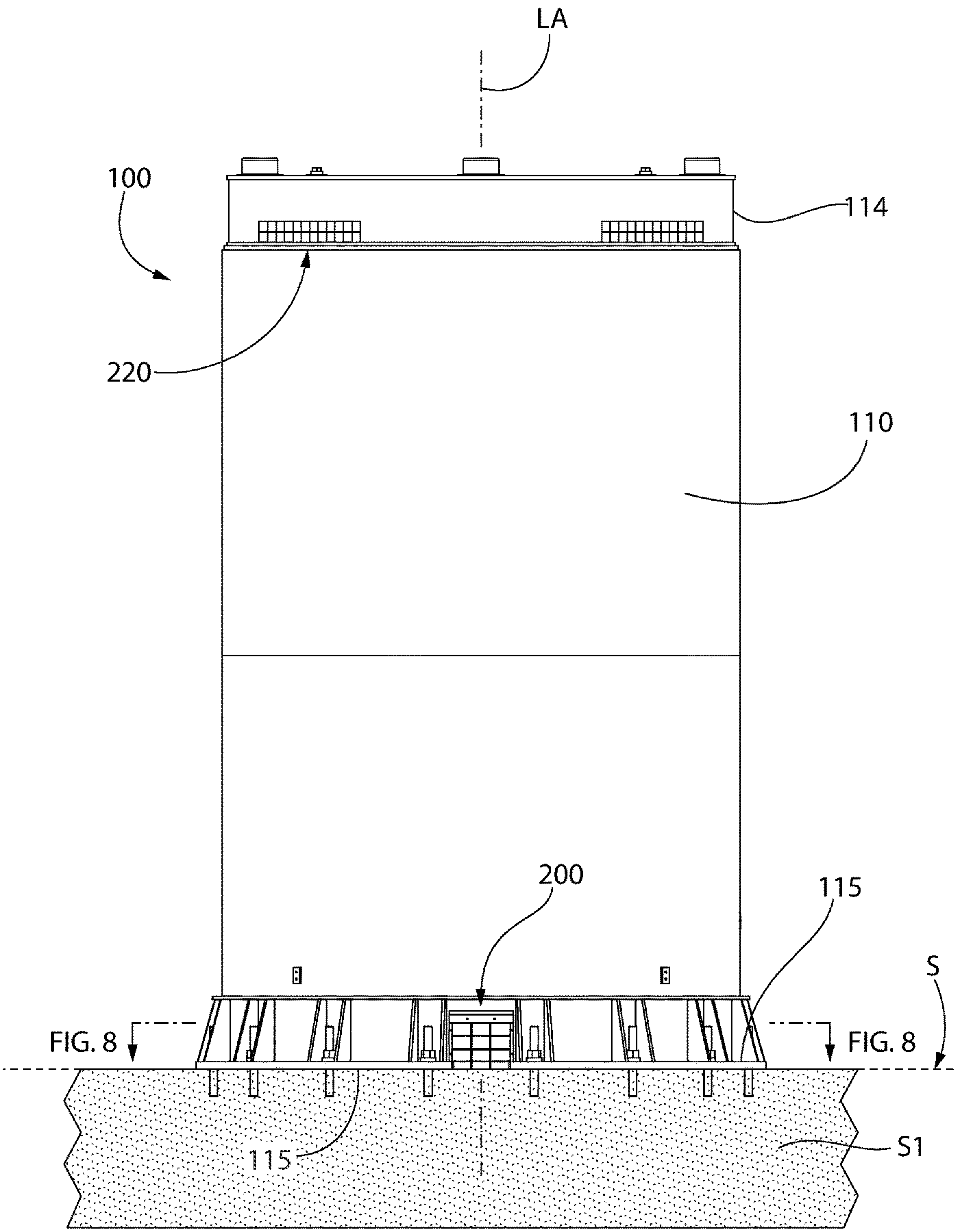
FIG. 4 is side view of the cask.
Figure 5:
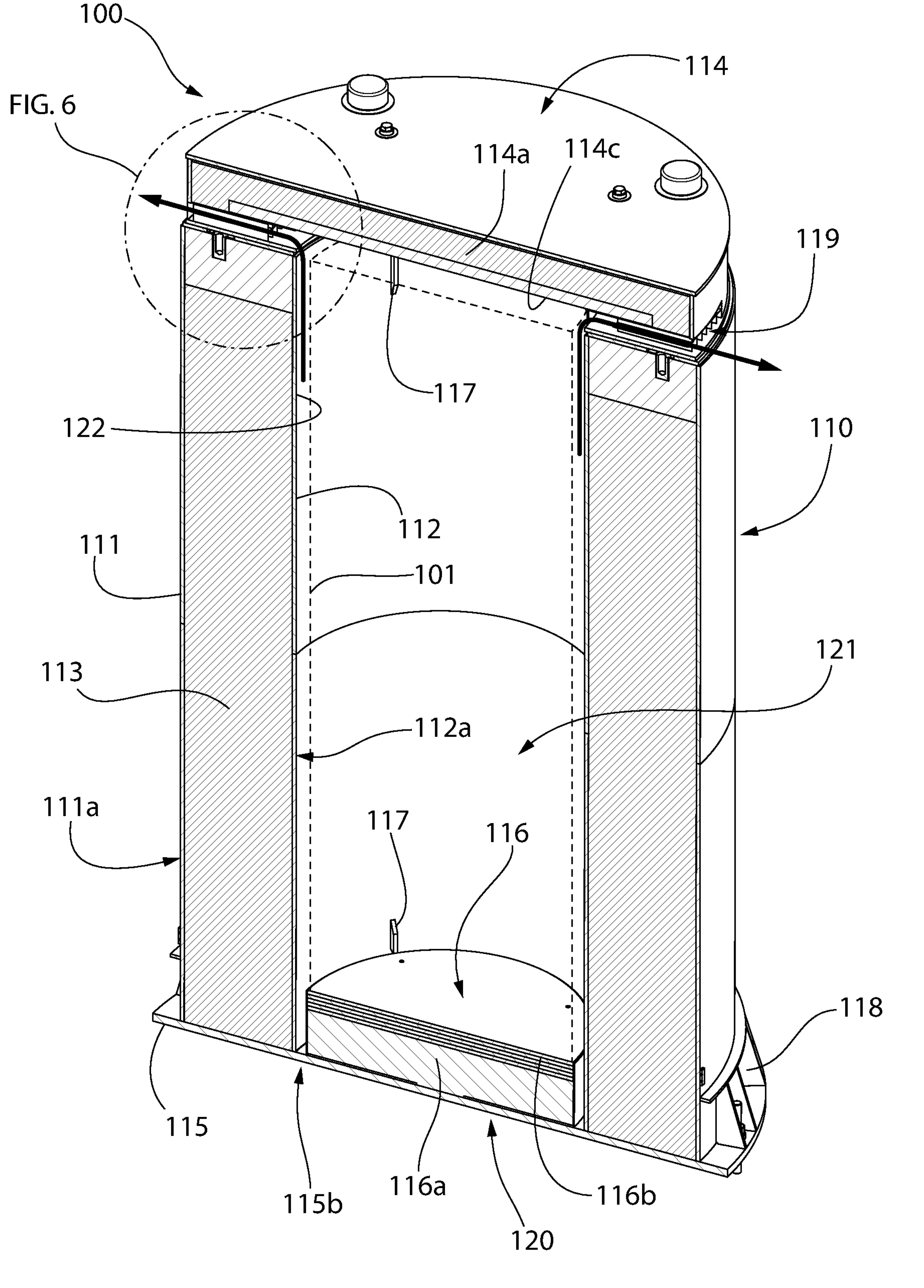
FIG. 5 is a first cross-sectional perspective view thereof.

Cavity 120 of cask 100 has a configuration and height suitable for holding a single SNF canister 101 therein (represented by dashed lines in FIG. 3). The diameter of cavity 26 is intentionally larger than the diameter of the fuel canister 29 by a smaller amount to form a ventilation annulus 122 between the canister 101*a* nd inner shell 112 within the internal cavity 121 of the cask (see, e.g. FIG. 7). The radial width of annulus 122 preferably is sufficient to draw heat generated by the SNF within the canister away from the canister as the cooling air flows upwards alongside the canister as it is heated via a natural convective thermosiphon effect. A typical airflow annulus may be in the range of about and including 2-6 inches in width as a non-limiting example depending on the estimated heat load of the fuel canister 100. The annulus 122 extends vertically for the full height of the canister which may terminate at top adjacent to the top ends of the upper guide lugs 117 discussed below. Accordingly the canister 101 has a height approaching the full height of the cask cavity 121, and at least greater than 3/4th the height of the cavity. annulus 122 further extend all the way down to the baseplate 115 alongside the pedestal 116 which may have a diameter commensurate with the diameter of the canister (see, e.g. FIG. 8). This lower portion of ventilation annulus 122 places the air inlet ducts 200 in fluid communication with the annulus (see, e.g. FIG. 7)

A plurality of radially and vertically extending guide lugs 117 are disposed at the upper and lower portions of the cask cavity 121. The array of upper and lower guide lugs 117 are circumferentially spaced apart and rigidly attached to the interior/internal surface 112*a* of the inner shell 112 such as via welding. Guide lugs 117 may be formed of steel plates and are provided around the entire inner shell at least at the upper and lower portions thereof for full 360 degree coverage. The inward vertical sides or edges of the guide tubes are configured to abuttingly engage and prevent the canister 101 from excessively moving laterally or rattling if vibrated during a seismic event or when being lifted and lowered by a crane or hoist from or into the cask internal cavity 121. Notably, the guide lugs 117 further act to maintain the ventilation annulus 122 between canister 100 and inner shell 112 of the cask to preserve this airflow passage for removing heat emitted by the canister. This allows a continuous flow of ambient cooling air to circulate around and flow upwards along the sides of the canister.

A radiation-shielded lid 114 is detachably coupled to the cask top end 119 which closes the normally upwardly open cavity 121 of cask 100 when in place. Lid 114 may be a circular cylindrical structure comprising a hollow metal outer housing 114*b* defining an interior space filled with a radiation shielding material 114*a* such as a concrete plug or liner encased by the outer housing. Other shielding materials may be used in addition to or instead of concrete. Lid 114 provides radiation shielding in the vertical upward direction, whereas the concrete liner 113 disposed between the inner and outer shells 112, 111 provides radiation shielding in the lateral or horizontal direction. With exception of the concrete liner, the foregoing lid-related components are preferably all formed of a metal such as without limitation steel (e.g. carbon or stainless).

Figure 6:
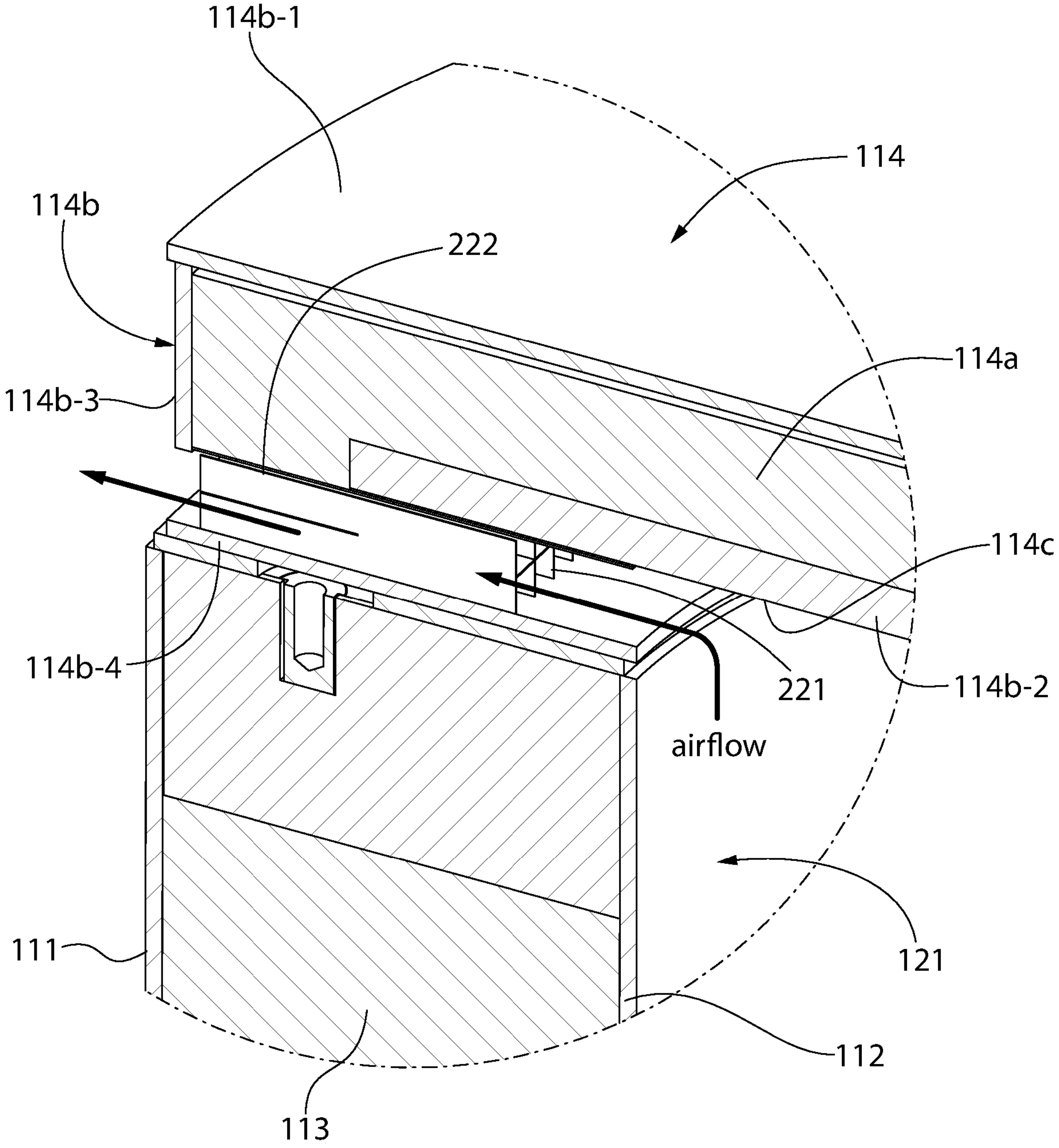
FIG. 6 is an enlarged detail taken from FIG. 5.
Figure 7:
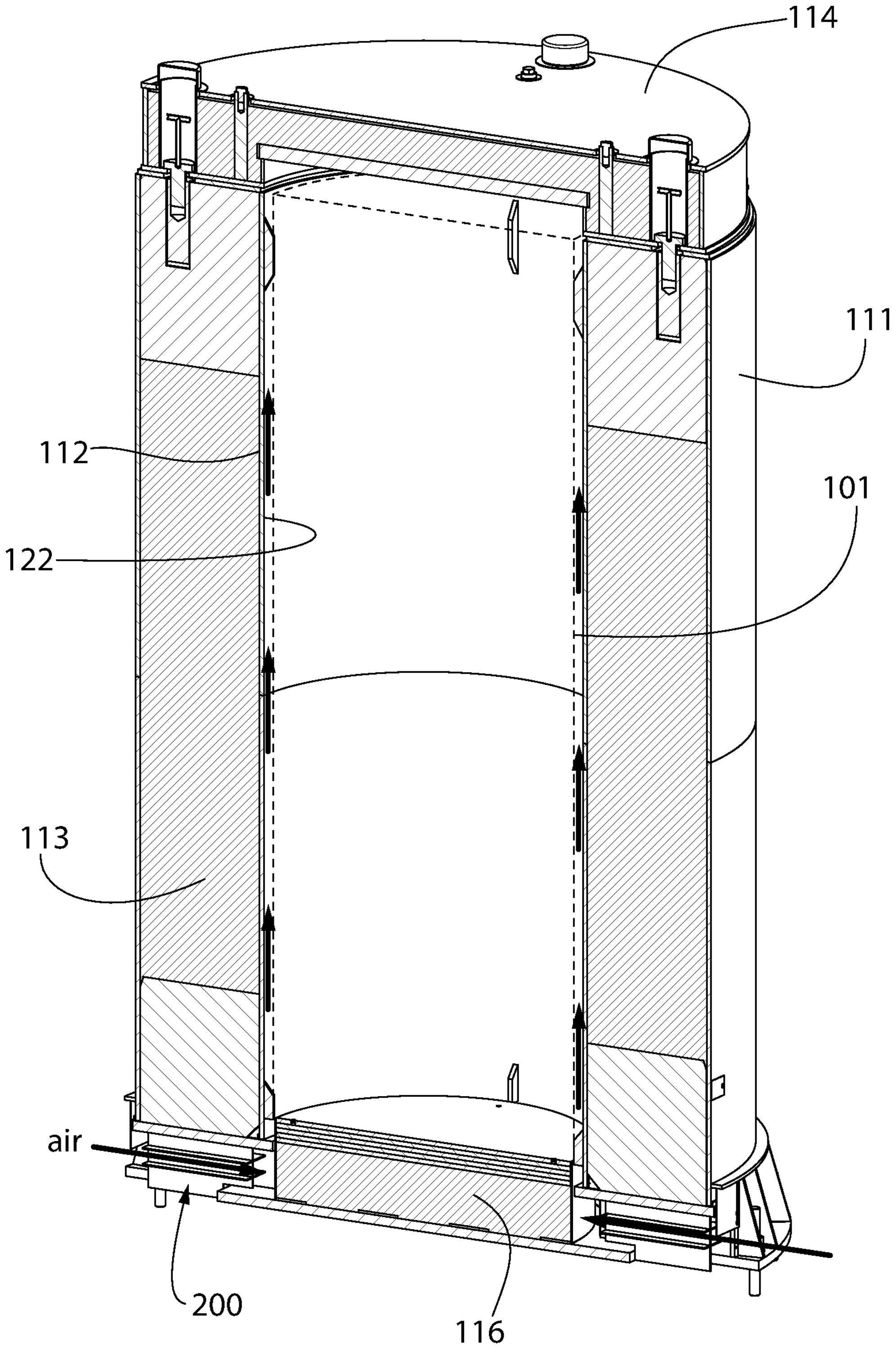
FIG. 7 is a second cross-sectional perspective view of the cask.
Figure 8:
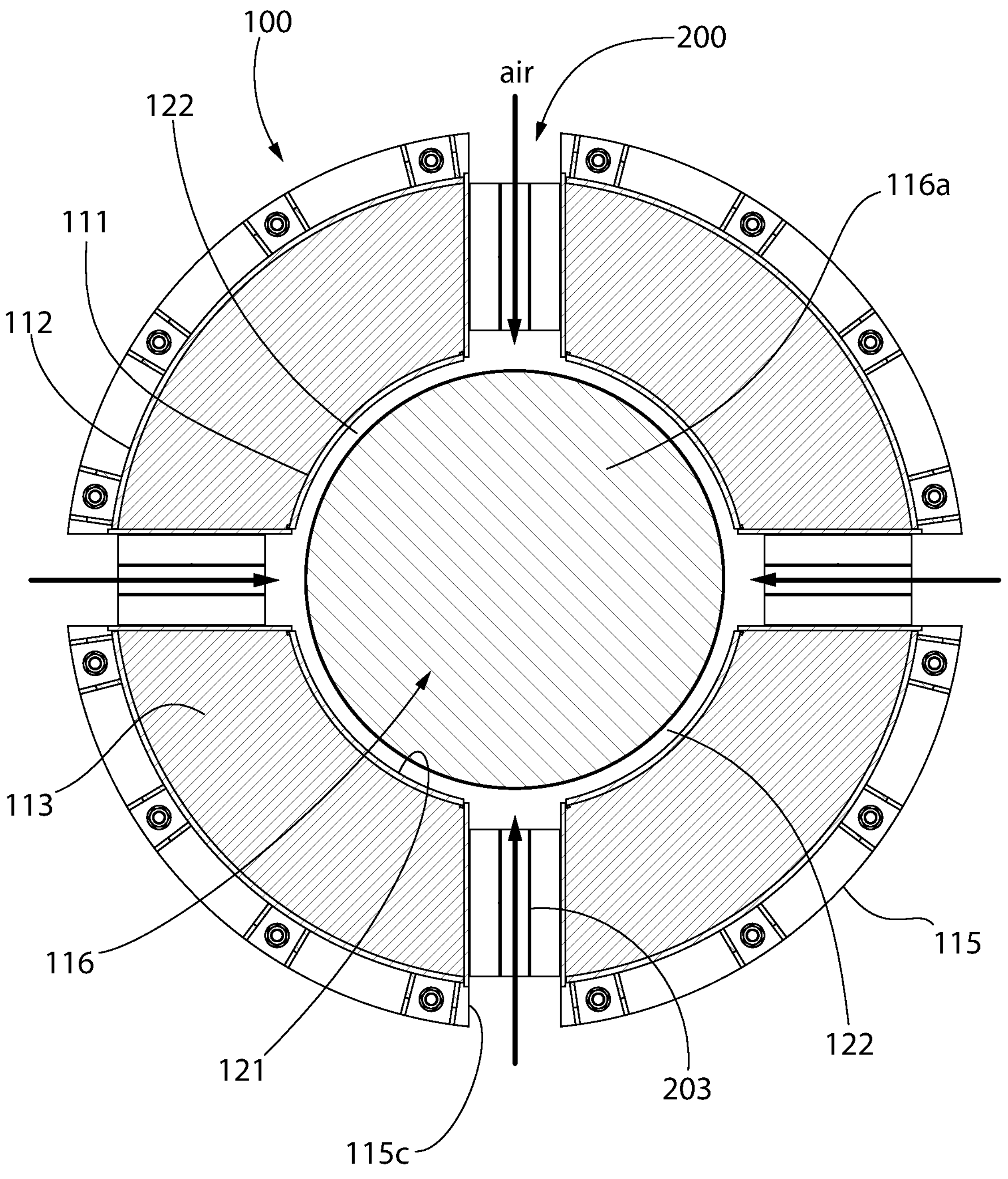
FIG. 8 is a transverse cross-sectional view thereof showing the air inlet ducts.
Figure 9:
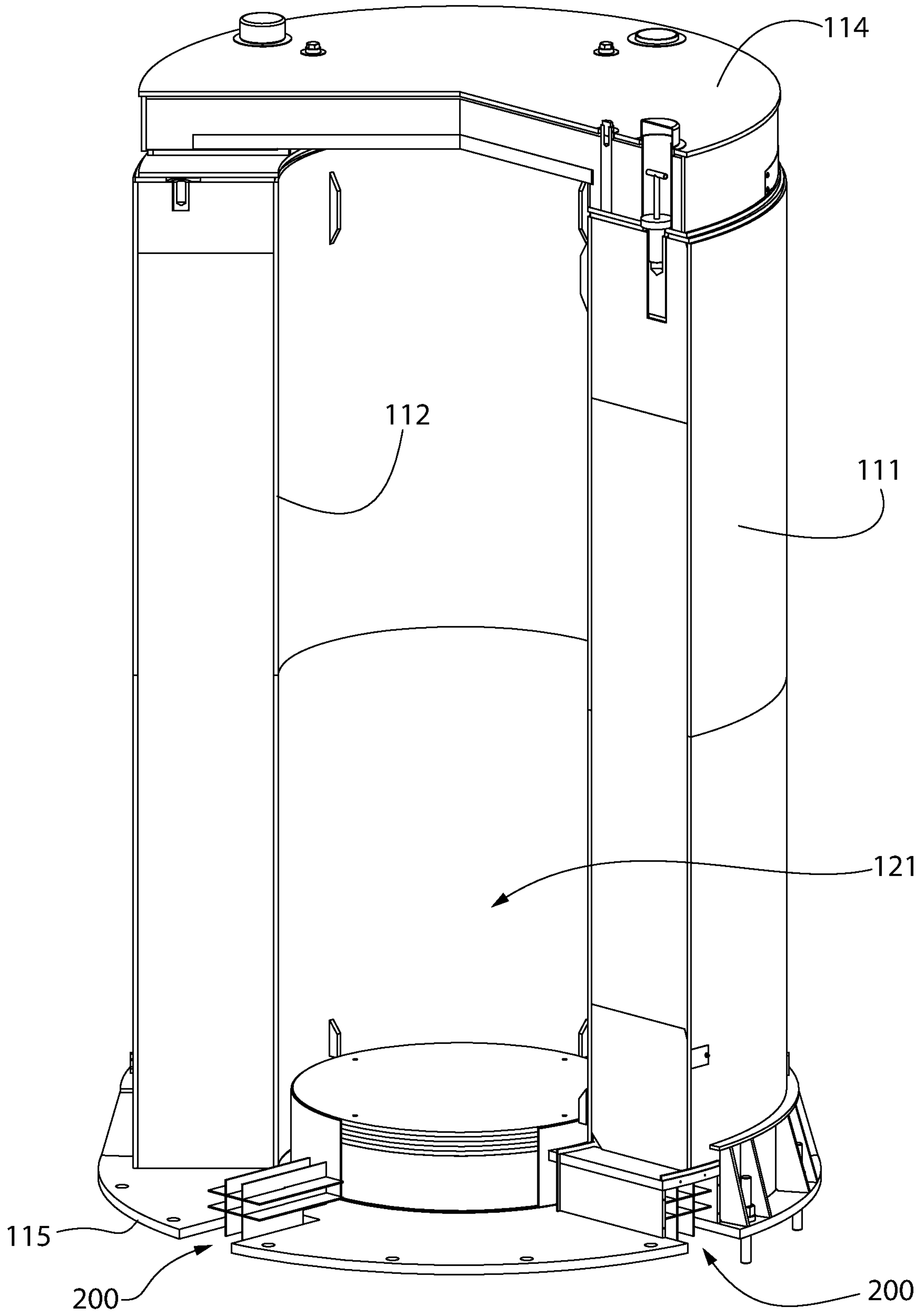
FIG. 9 is a third cross-sectional perspective view of the cask showing details of the inlet ducts.

Housing 114*b* of lid 114 may include top cover plate 114*b*-1, bottom cover plate 114*b*-2, bottom peripheral ring plate 114*b*-4, and a circumferentially-extending peripheral ring wall or shell or 114*b*-3 extending vertically between the ring plate and top plate (see, e.g. FIG. 6). All plates may be flat and the ring shell may be cylindrical in shape in a certain embodiment. Ring shell 114*b*-3 extends downwards farther than bottom cover plate 114*b*-2 forming a central air collection recess 114*c* on the underside of the lid above the peripheral ring plate 114*b*-4. Central air collection recess 114*c* is downwardly open to internal cavity 121 of cask 100 to receive the rising ventilation air form the ventilation annulus 122 which is heated by the canister. The central recess collects the heated ventilation air and directs the air through the radial air outlet ducts 220 in lid 114 for discharge to atmosphere, as further described herein.

According to one aspect of the nuclear waste fuel storage system, the vertical ventilated nuclear fuel storage cask 100 includes a natural circulation cooling air ventilation system (i.e. unpowered by fans/blowers) for removing decay heat emitted from the canister 101 which holds the SNF. The cooling airflow provided by ambient air surrounding the cask is driven by natural convective thermo-siphon effect in which air within the ventilation annulus 122 is heated by the canister 101 which emits the heat generated by the decaying SNF inside causing an upflow.

Referring generally to FIGS. 1-15 as applicable, the cask ventilation provisions include a plurality of circumferentially spaced apart cooling air inlet ducts 200 to draw and introduce ambient cooling air into the internal cavity 121 of cask 100, and a plurality of circumferentially spaced apart cooling air outlet ducts 220 to expel the air heated by canister 100 from the cavity back to atmosphere. Both the air inlet and outlet ducts may generally be radially oriented and communicate with cask cavity 121, and particularly ventilation annulus 122 formed in the cavity between canister 101 and inner shell 112 of the cask body 110. In a one non-limiting preferred embodiment, the air inlet ducts 50 are disposed in and formed through the lower portion of cask body proximate to the bottom end 120 of the cask and cavity. Conversely, the air outlet ducts 220 are disposed proximate to the top end 119 of the cask 100.

Each air inlet duct 200 extends horizontally/laterally completely through the sidewall formed by the cask body 110 from outer shell 111 to inner shell 112. The radially oriented ducts 200 define air inlet passageways which place the lower portion of the cask cavity 121 and ventilation annulus 122 in fluid communication with ambient atmosphere and cooling air. Inlet ducts 200 may be horizontally oriented and linearly straight in configuration in one non-limiting preferred embodiment as shown. The inlet ducts may be circumferentially spaced apart around the circumference of the cask. In one embodiment, inlet ducts 200 may be equally spaced apart and may include at least four ducts to uniformly deliver ambient cooling air to each quadrant of the SNF canister 101 (see, e.g. FIG. 8).

Figure 10:
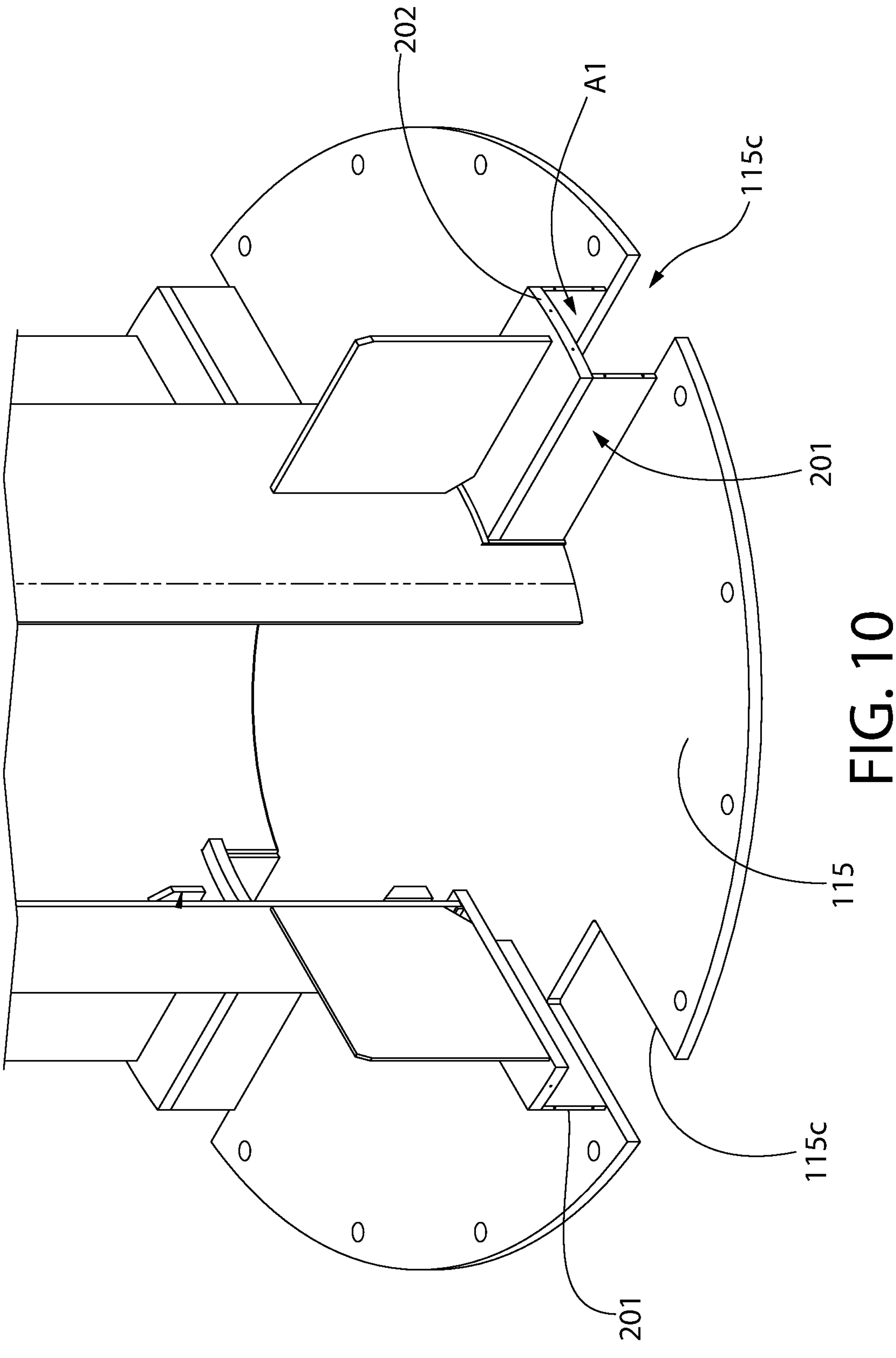
FIG. 10 is a perspective view of the bottom baseplate of the cask and air inlet duct structure.
Figure 11:
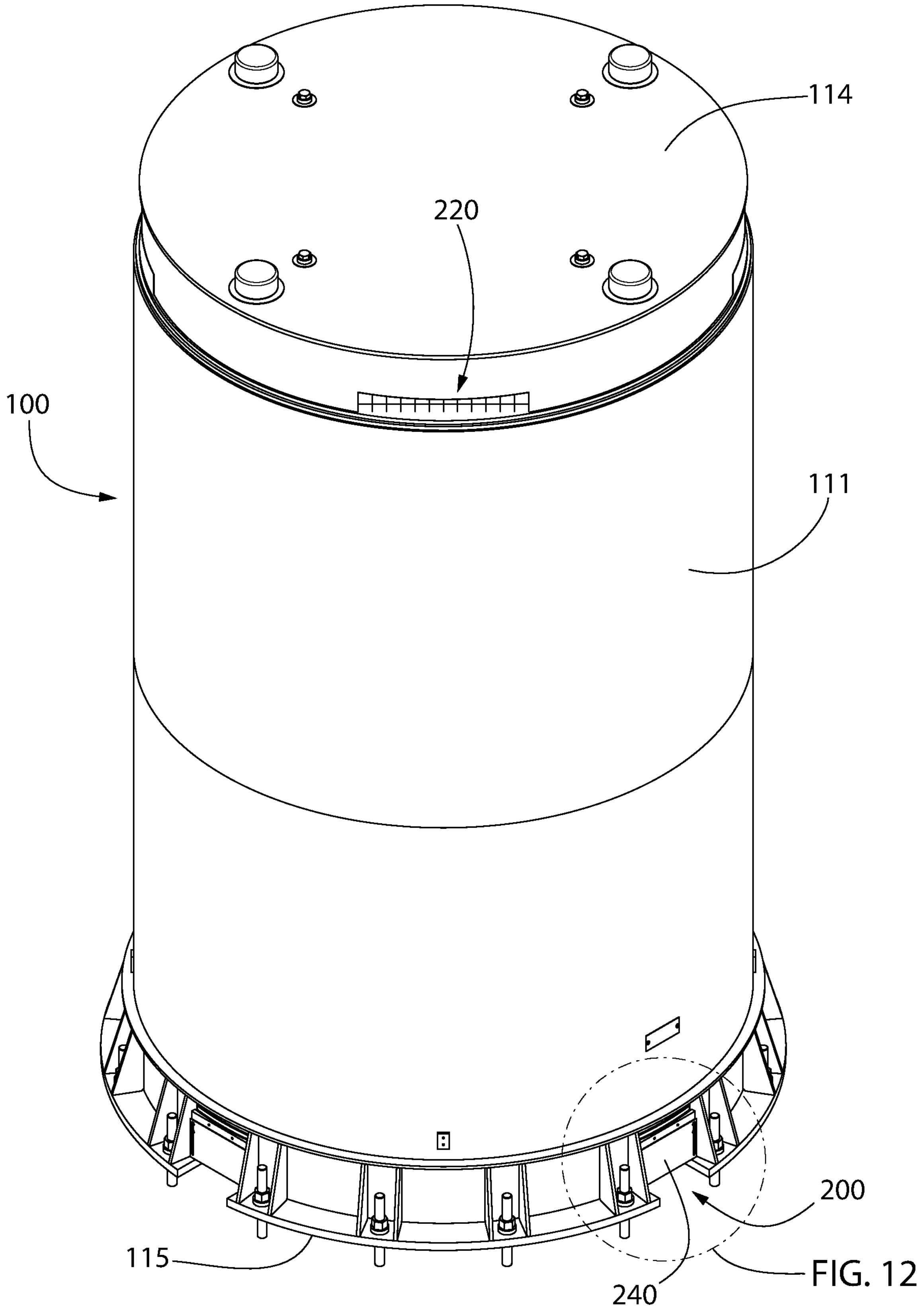
FIG. 11 is a second top perspective view of the cask.
Figure 12:
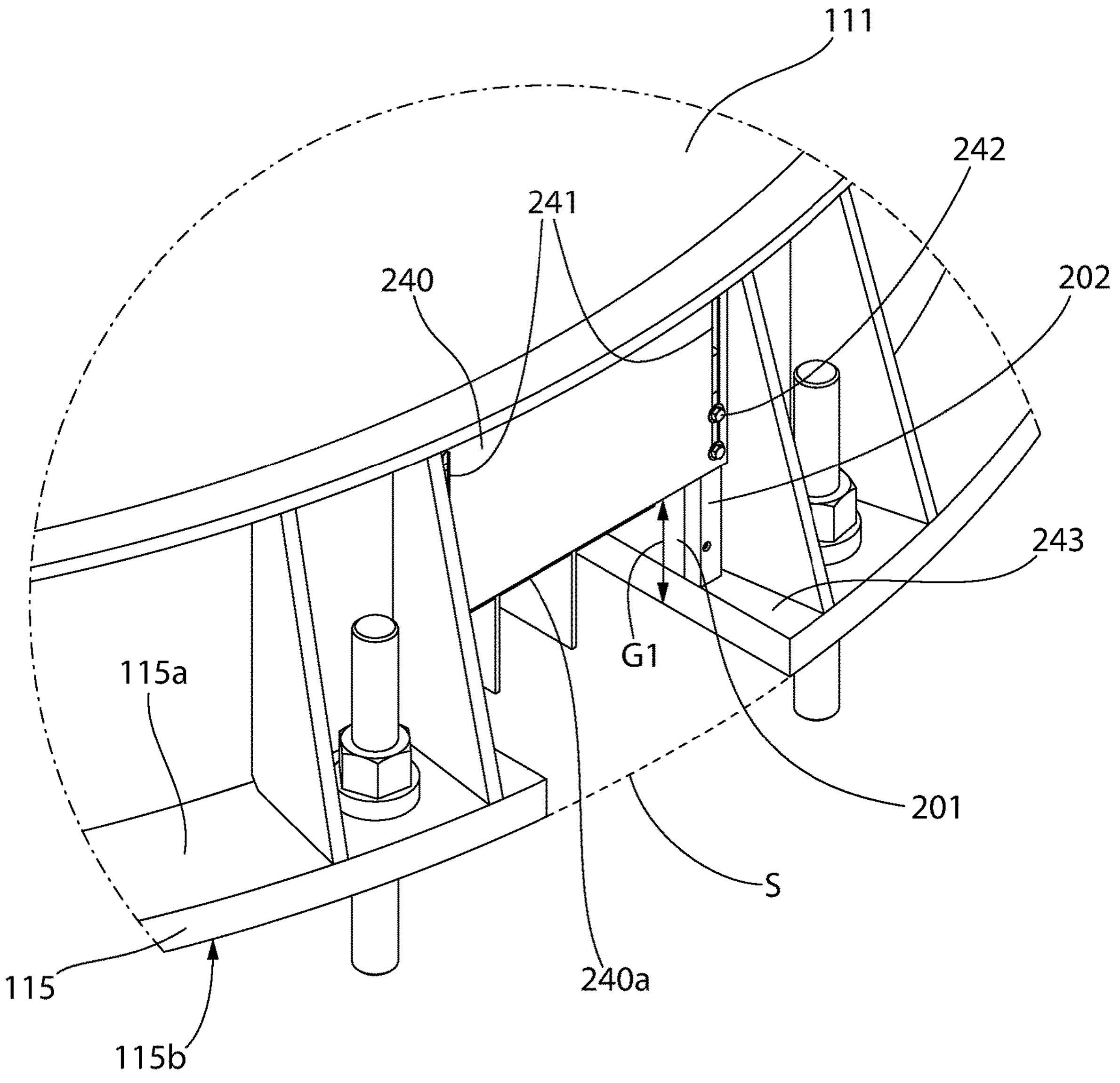
FIG. 12 is an enlarged detail of an air inlet duct of the cask taken from FIG. 11 and showing the adjustably movable shutter plate of the air inlet duct in a first upper operating position.

In one embodiment, the air inlet ducts 200 may be located directly adjacent to top surface 115*a* of baseplate 115 (see, e.g. FIGS. 3 and 10). Each air inlet duct 200 includes an outer portion which penetrates outer shell 111, and an inner portion which penetrates inner shell 112. The ducts 200 are configured and arranged to introduce ambient cooling air directly into the bottom of the ventilation annulus 122 between the canister 101 and inner shell 112, and preferably adjacent to the top surface of the baseplate 115.

Referring initially to FIGS. 2-3 and 7-10, each air inlet duct 200 may comprise a generally rectangular inlet flow box 201 extending radially through the sidewall of the cask body (i.e. shells 111, 112 and radiation shielding material 113 therebetween) to fluidly connect ambient air to the internal cavity 121 and ventilation annulus 122 of the cask 100. In one embodiment, the flow box may be a three-sided inverted U-shaped orthogonal structure formed of steel plates welded together and in turn is welded to the baseplate 115 (best shown in FIG. 10). The interior outlet of the flow box 201 penetrates the inner shell 112 within the ventilation annulus 122 (visible in FIG. 10). The external portion or entrance of the inlet flow box 201 may be terminated with an outward facing flat face frame 202 to which a shutter plate 240 (further described elsewhere herein) may be coupled to regulate the inflow of ambient cooling air into the cask 100. Advantageously, this simpler construction allows the shutter plate 240 to be formed of a flat piece of steel or other metallic plate thereby obviating the need and additional expense of forming curved shutter plates to match the arcuately curved external surface 111*a* of the cask outer shell 111.

To prevent radiation streaming from the SNF inside the canister 101 when disposed in cask 100 to the ambient environment through the inlet ducts 200, each inlet duct 200 may be fitted with a gamma shield 203 formed by an orthogonal grid array of shielding plates 203*a*. The shielding plates 203*a* extending radially from the external surface to the internal surface of the cask sidewall inside the inlet flow box 201. The shield 203 defines an array of radial airflow openings 203*b* through which cooling air may enter the internal cavity 121 of cask 100 from atmosphere.

The radial cooling air outlet ducts 220 may be formed in housing 114*b* of the lid. FIG. 6 is a close-up view of one of the outlet ducts. Each air outlet duct 220 extends horizontally/laterally completely through the lid 114 and may be disposed adjacent to the bottom of the lid. The ducts 220 may be formed above and adjacent to peripheral ring plate 114*b*-4. Each duct 220 is defined by an inverted U-shaped outlet flow box 222 formed of metal plates which extends horizontally/laterally through peripheral shell 114*b*-3 of the lid housing 114 at the outer end, and opens inwardly to the central air-collection recess 114*c* of the lid to receive the rising heating air from the ventilation annulus 122. Each air outlet duct 220 may be fitted with a gamma shield 221 having a similar construction to and for the same purpose as gamma shield 203 of the air inlet ducts 200 previously described herein.

The radially oriented air outlet ducts 220 define air outlet passageways which place the upper portion of the cask cavity 121 and ventilation annulus 122 in fluid communication with ambient atmosphere to discharge the rising cooling or ventilation air heated by the canister 100 back to the external environment surrounding the cask 100. Outlet ducts 220 may be horizontally oriented and linearly straight in configuration in one non-limiting preferred embodiment as shown. The outlet ducts may be circumferentially spaced apart around the circumference of the lid 114. In one embodiment, outlet ducts 220 may be equally spaced apart and may include at least four ducts to uniformly extract and expel the rising ventilation or cooling air heated by each quadrant of the SNF canister 101 for efficient canister cooling. In one embodiment, at least four outlet ducts may be provided. In other embodiments, more or fewer outlet ducts (including only a single outlet duct) may be provided.

In operation, air inside the ventilation annulus 122 of the cask 100 between the canister 101 and inner shell 112 is heated by the canister. The heated air rises, enters the central air collection recess 114*c* on the underside of the lid contiguous with the cask internal cavity 121, and is discharged to atmosphere through air outlet ducts 220. Concomitantly, the rising heating air draws available ambient cooling air surrounding the cask through the air inlet ducts 200 at the bottom of the cask via natural convective thermo-siphon effect. This ventilation air circulation pattern continues indefinitely as long as the canister emits some degree of heat.

As the SNF stored in canister 101 decays over time, the heat emission rate will drop and correspondingly the air in the ventilation annulus 122 will decrease. The air temperature surrounding particularly the lower portion of the canister may drop to a value or level which is conducive to the onset of stress corrosions cracking (SCC) particularly when the cask is located in a marine or similar high humidity environment in the presence of halides, as previously described herein. It is therefore desirable to have the ability to reduce the airflow rate through the cask to maintain the canister maximum temperature limit previously described herein which can also minimize the chance of the onset of SCC at the exposed canister weld seams.

According to another aspect of the present natural convective circulation cooling air ventilation system, the system includes provisions and features for regulating the airflow rate through the internal cavity 121 of cask 100 which houses the SNF canister 101. The ventilation system is the primary mechanism in a ventilated cask nuclear fuel storage system by which heat is extracted from the canister 101 and rejected to the surrounding environment.

Accordingly, the present cask ventilation system provides user-controllable and adjustable throttling of the natural convective airflow by opening or partially closing the ventilation air passageways formed by the inlet or outlet ducts 200, 220. This airflow regulation may be used to maintain the temperature of air surrounding the canister 101 inside the cask cavity 121 at or near the predetermined canister maximum temperature limit which is detrimental to the onset of stress corrosion cracking (SCC) at the canister welds as previously described herein.

In one embodiment, the airflow throttling mechanism comprises a vertically adjustable shutter plate 240 coupled to the outer end of preferably each the air inlet ducts 200. The movable shutter plate acts as a variable orifice and defines a variable flow opening area A1 for each duct which is configured and operable to throttle or adjust an inflow of cooling air drawn into and through the internal cavity 121 of the cask 100 and ventilation annulus 122 adjacent the canister 101. Accordingly, the shutter plates 240 are vertically adjustable in position on the cask to vary the flow opening area A1 to increase or decrease the inflow of cooling air to maintain the desired canister 101 temperature at or near the predetermined canister maximum temperature limit. The peripheral outer edge of the baseplate 115 in preferred non-limiting embodiments may comprises a cutout 115*c* at each of the cooling air inlet duct 200 locations on the cask 100. This forms a discontinuous and interrupted outer circumference and edge of the baseplate forming a castellated baseplate configuration (see, e.g. FIGS. 10-15). The cutouts 115*c* contribute to and are contiguous with the flow opening area A1.

When the SNF (spent nuclear fuel) inside the canister 101 is newer (i.e. recently removed from the reactor), the heat emitted through the canister walls will be greater. Accordingly, a higher airflow rate (e.g., CFM—cubic feet per minute) is desirable to prevent overheating and damage the SNF fuel assemblies in the canister. As the SNF ages, the heat emitted will decrease. Accordingly, it then becomes desirable to reduce the airflow rate to prevent the onset of SCC while balancing the need to keep the SNF from overheating. The present shutter plates 240 allow such adjustment to be readily made over time by monitoring the temperature of the heated ventilation air discharged from the cask and/or the canister 101 external wall temperature such as via temperature sensors 230 (shown in FIG. 1) such as thermistors or thermocouples.

Shutter plates 240 are vertically movable between a first upper position associated with a first flow opening area A1*a*, and a second lower position associated with a second flow opening area A1*b* which may be smaller than the first flow opening area. These positions and flow opening areas are represented in FIGS. 12-15. The flow opening areas A1*a*, A1*b* for inlet ducts 200 are each measured and defined between bottom edge 240*a* of the shutter plate 240 and the bottom surface 115*b* of baseplate 115, which also happens to coincide with the top support surface S of concrete support slab S1 on which the baseplate rests. Gap G1 is formed between bottom edge 240*a* and baseplate bottom surface 115*b*/support surface S when shutter plate 240 is in the upper position. This sets the extent of the flow opening area A1*a* denoted by the dashed hatching in FIG. 14, which may be a maximum flow opening area (and open position of shutter plate 240) and maximum gap G1 allowing the greatest inflow of induced ambient cooling air into the cavity 121 of cask 100. This position of shutter plate 240 may be used for example when the SNF is initially removed from the reactor and loaded into the canister 101 and cask 100 to maximize cooling of the canister.

When shutter plate 240 is in the lower position, gap G2 is formed between bottom edge 240*a* and baseplate bottom surface 115*b*/support surface S when shutter plate 240. Gap G2 is smaller than gap G1. This sets the extent of the smaller flow opening area A1*b* denoted by the dashed hatching in FIG. 15, which may be a minimum flow opening area and gap G2 allowing the least inflow of induced ambient cooling air into the cavity 121 of cask 100. This position of shutter plate 240 may be used for example after a prolonged period of time when the decay heat emitted by the SNF in canister 101 has decreased significantly. The smaller flow opening area A1*b* may be set to maintain the canister 101 at or near the predetermined canister maximum temperature limit associated with both preventing overheating and damaging the fuel cladding (fuel rods) stored in the canister, which in turn prevents the onset of stress corrosion cracking (SCC) at the canister weld seams.

To leverage the variable airflow control technique, a benchmarked thermal model of the cask may be prepared using a commercially-available computational fluid dynamics (CFD) code or software such as FLUENT to ascertain the predetermined canister maximum temperature limit. The model may be benchmarked by measuring the temperature of reference points on the top lid and comparing the measured values with the predicted temperature from the CFD analysis. The "normalized" thermal model can then be used to inform the appropriate extent of inlet vent or duct flow opening reduction required to keep the outer wall of the canister 101 as hot as possible without exceeding the regulatory limit on the fuel cladding temperature with sufficient safety margin. This predetermined canister maximum temperature limit based on the CFD results will concomitantly maintain the air temperature within the cask internal cavity as high as possible to provide conditions which are not conducive to the onset of stress corrosion cracking (SCC) at the exposed canister welds. For a typical canister, calculations show that the heat rejection demand drops sufficiently within the first 20 years of canister storage to warrant reducing the vent openings by as much as 90% in order to keep the canister at or near the canister maximum temperature limit and as warm as it was at the time it was first placed in service. For certain waste fuel loading scenarios, almost or complete closure of the vents may be advisable at coastal or other sites with non-negligible halide concentrations in the ambient environment within as little as 10 years from placement into service It bears noting that the shutter plates 240 may be adjusted in position anywhere between the upper maximum and lower minimum positions described above and shown to throttle the airflow between maximum and minimum as needed by the user or operator to maintain the cask minimum internal air temperature threshold or limit. Accordingly, the airflow rate is adjustably variable between maximum and minimum.

Figure 13:
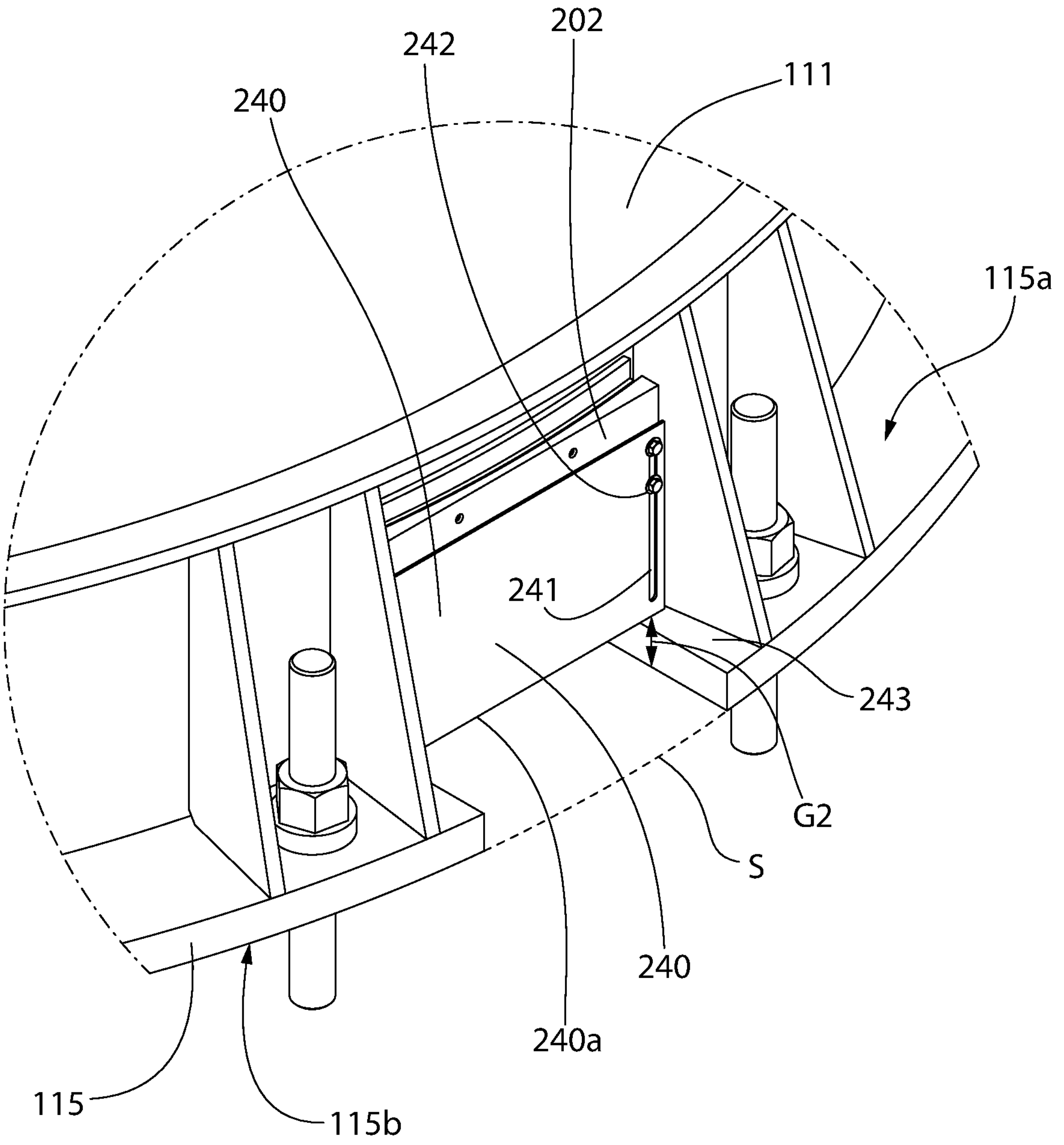
FIG. 13 is a view thereof but showing the adjustably movable shutter plate of the air inlet duct in a second lower operating position.
Figure 14:
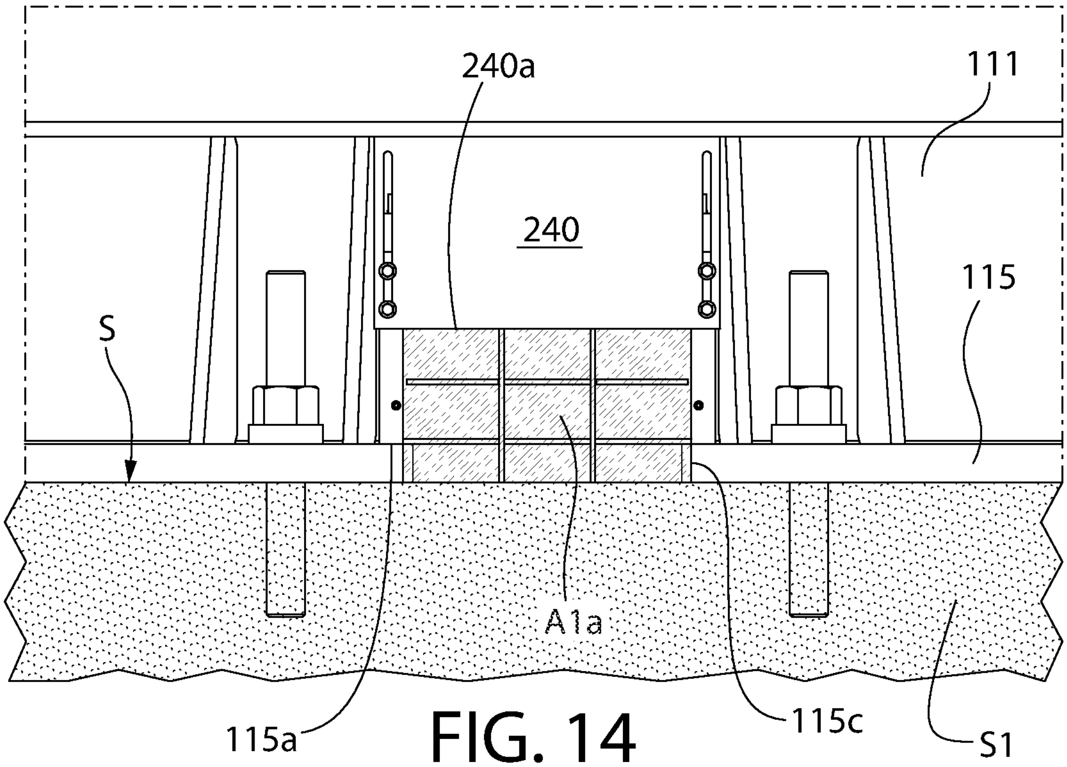
FIG. 14 is an enlarged side view of the air inlet duct of FIG. 12 showing the adjustably movable shutter plate in the first upper operating position associated with a first open flow area.
Figure 15:
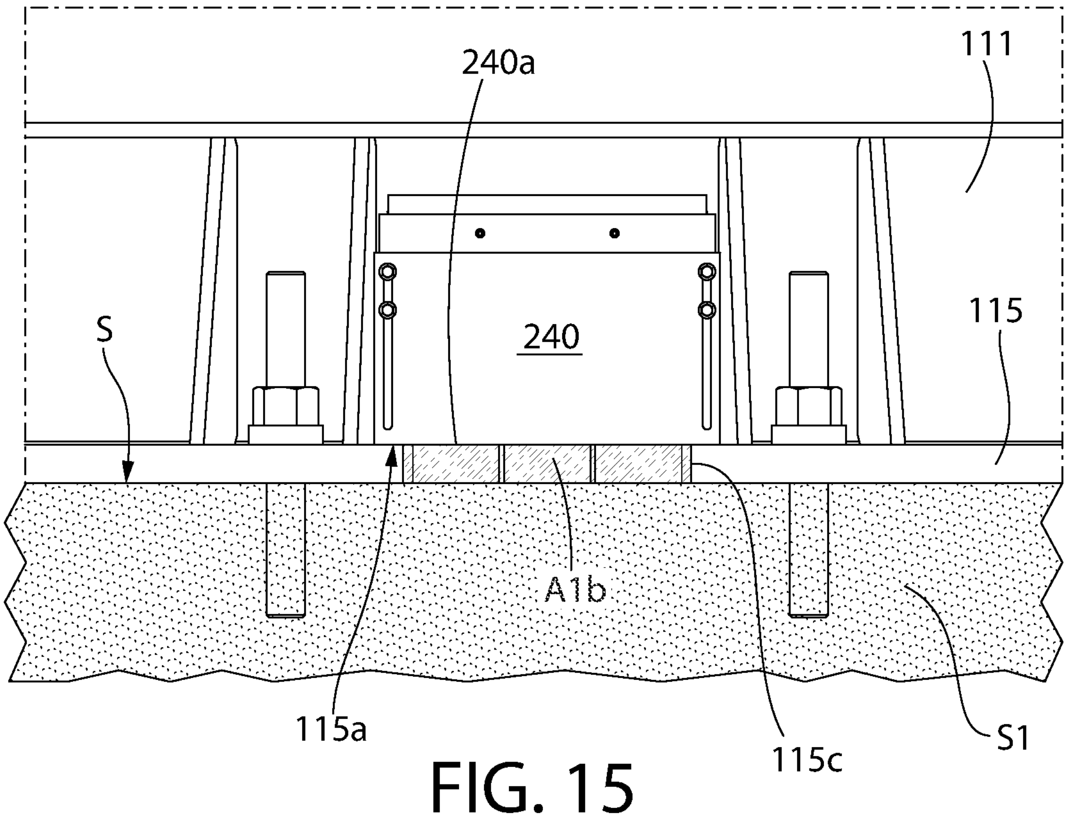
FIG. 15 is an enlarged side view of the air inlet duct of FIG. 13 showing the adjustably movable shutter plate in the second lower operating position associated with a second open flow area smaller than the first open flow area.

A failsafe measure may be provided to ensure some amount or degree of ambient cooling air can always flow into internal cavity 121 of cask 100 and reach the canister 101 via the natural convection to prevent overheating the SNF stored therein. In one embodiment, the baseplate 115 may be configured such that the bottom edge 240*a* of each shutter plate 240 abuttingly engages the top surface 115*a* of the baseplate adjacent to cutouts 115*c*. Top surface 115*a* of the baseplate therefore forms a travel stop 243 which limits the minimum closed position of shutter plate as shown in FIGS. 13 and 15, which is not a fully closed position. The minimum flow opening area A1*b* is maintained at all times between the bottom edge of the shutter plate 240 and top support surface S of concrete support pad S1. Accordingly, bottom edge 240*a* of shutter plate 240 can never engage support surface S in this embodiment to fully close off the inlet ducts 200. The baseplate cutouts 115*c* advantageously ensure some degree of ambient cooling air can enter the cask cavity 12. In other embodiments contemplated however where it might be desirable to be able to fully close the inlet ducts, the baseplate 115 and shutter plates 240 may be designed to engage the top support surface S.

Shutter plates 240 may be slideably coupled to the outer part of each ambient cooling air inlet duct for vertical movement and adjustment to vary the ventilation air inflow into cask 100. In one embodiment, each shutter plate 240 may be slideably coupled to the flat outer face frame 202 formed by the inlet flow boxes 201 associated with each air inlet duct 200 (see, e.g. FIGS. 10-15). In other possible embodiments, however, the shutter plates 240 may be slideably mounted directly to the external surface 111*a* of the outer shell 111 near the bottom end of the cask.

Each shutter plate 240 in the illustrated embodiment includes at least one vertically elongated adjustment slot 241 through which at least one threaded locking fastener 242 is inserted to threadably engage the inlet flow box face frame 202. In one embodiment, a pair of slots 241 may be provided at opposite sides of the shutter plate (see, e.g. FIG. 12) for added securement. Threaded fastener holes 202*a* (see, e.g. FIG. 3) may be pre-formed in the face frame to receive each of the locking fasteners. The fasteners 242 are tightened to fix the position of shutter plates 240 to set the desired gap and flow opening area of the air inlets 200. To vertically adjust the position of the shutter plates and corresponding flow areas, the locking fastener 242 may be loosened. This allows the plate 240 to be slid up or down to the desired location. The fastener is then tightened to lock the shutter plate 240 in position.

In operation, once the shutter plates 240 are vertically adjusted and fixed in position via tightening the locking fasteners 242 to set the desire airflow rate through inlet ducts 200, ambient cooling air is drawn inwards through the ducts beneath each shutter plate which forms a variable orifice of sorts. The air flows radially inwards through the openings 203*b* in the gridded gamma shield 203 and enters the bottom of the ventilation annulus 122 adjacent to the top surface of baseplate 115 and sides of the cylindrical pedestal 116 (see, e.g. FIG. 7). The air heated by the canister rises inside the annulus 122 and exits the top of the cask internal cavity 121 via the outlet ducts 220 in the lid 114.

Although shutter plates 240 are described above and shown as being mounted to the air inlet ducts 200, in other possible embodiments the shutter plates may instead be mounted to the air outlet ducts 220 in lid 114 to regulate the inflow of ambient cooling air into the cask 100. The shutter plates may be similarly configured and mounted to the air outlet ducts in the same manner disclosed for the inlet duct arrangement without further undue elaboration.

Although flat shutter plates 240 are shown, in other embodiments arcuately curved shutter plates may instead be used as needed while maintaining the vertical adjustment features previously described herein.

Below Grade Ventilated Nuclear Fuel Storage Cask

FIGS. 16-31 depict various aspects of a nuclear fuel storage system generally comprising a second embodiment of a passively cooled and naturally ventilated outer storage module or cask 300. Cask 300 is constructed for partial and substantial underground/below grade placement wherein a majority of the height of the cask is located below grade and the entirety of the SNF canister 101 is below grade for radiation shielding provided by the surround embedment. Whereas above grade storage cask 100 previously described herein is heavily radiation shielded, storage cask 300 conversely is unshielded. Instead, cask 300 utilizes the surrounding at grade and below grade embedment materials such as concrete and engineered fill (e.g., compacted soil, crushed stone, masonry waste material, etc. and combinations thereof) to block and absorb the radiation emitted by the SNF inside the nuclear waste fuel canister 101. Cask 300 is compatible for use in underground nuclear waste fuel and high level waste storage systems forming part of an Independent Spent Fuel Storage Installation (ISFSI) such as the HI-STORM UMAX Dry Storage System available from Holtec International of Camden, New Jersey.

The naturally ventilated below grade storage cask 300 may be double-walled vessel in one embodiment including an elongated cask body 210 formed by a cylindrical outer shell 211 and concentrically arranged cylindrical inner shell 212 nested inside the outer shell. The shells 111, 112 collectively define the sidewall of the cask. The shells of cask 300 are embedded in radiation shielding materials such as a reinforced concrete top pad 213 surrounding the upper portion of the cask and layer of intermediate embedment material 215 extending from the top pad to the bottom of the cask body (inner and outer shells). Intermediate embedment material 215 may be concrete or engineered fill. The upward facing exposed top surface of top pad 213 defined grade. The cask 300 further includes circular baseplate 216 which is seated on and fixedly coupled to a reinforced concrete base pad 214 such as via bolting. The top pad and intermediate layer of embedment material directly contacts outer shell 211.

Inner shell 212 of cask 300 comprises a vertically-extending internal cavity 221 which extends along a centerline or longitudinal axis LA defined by the vertically elongated cask. The cavity 221 has a cross-sectional area configured to hold a single SNF canister 101. Cavity 221 may be of cylindrical configuration in one embodiment with a circular cross-sectional shape; however, other shaped cavities with corresponding cross-sectional shapes may be used. The metal baseplate 216 may be seal welded to the bottom ends of inner and outer shells 212, 211 at the bottom end of cask 300 prevent the ingress of water. The metallic inner and outer shells 212, 211 may be formed of the same metals as inner and outer shells 112, 111 of cask 100 (e.g., carbon or stainless steel).

Outer shell 211 is radially spaced apart from inner shell 212 defining an annular ventilation downcomer 211*a* therebetween. An annular ventilation riser 212*a* is formed between canister 101 and inner shell 212. At the bottom, downcomer 211*a* is in fluid communication with the lower portions of cavity 221 of the cask and ventilation riser 212*a* via a plurality of circumferentially spaced apart flow openings 217 formed by and between downwardly protruding legs 218 on the bottom end of inner shell 212. The bottom end of outer shell 211 and legs 218 of inner shell 212 rest on the flat top surface of base pad 214 (see, e.g. FIG. 25). The upper portion of ventilation downcomer 211*a* is in fluid communication with ambient atmosphere through lid 230 for drawing in cooling ventilation air, as further described herein.

Inner shell 212 may include a plurality of circumferentially spaced upper and lower upper guide lugs 117 similar to cask 100 previously described herein to center the SNF canister 101 and maintain an open ventilation riser 212*a* all around the canister.

Figure 16:
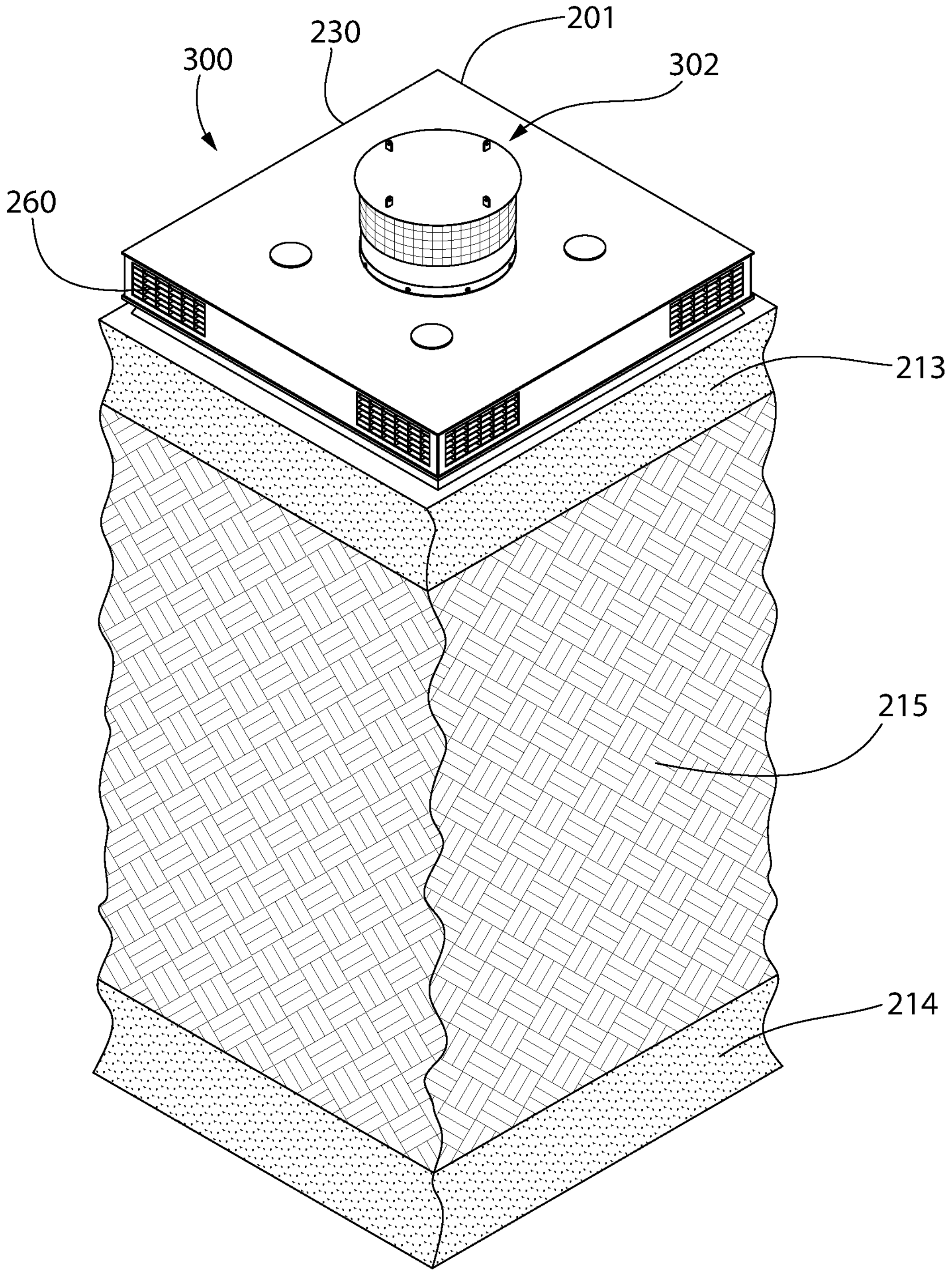
FIG. 16 is a top perspective view of a partial below-grade passively cooled and ventilated cask according to the present disclosure for storing the fuel storage canister, the cask body (shells) being shown embedded in embedment materials and the top lid exposed above grade.
Figure 17:
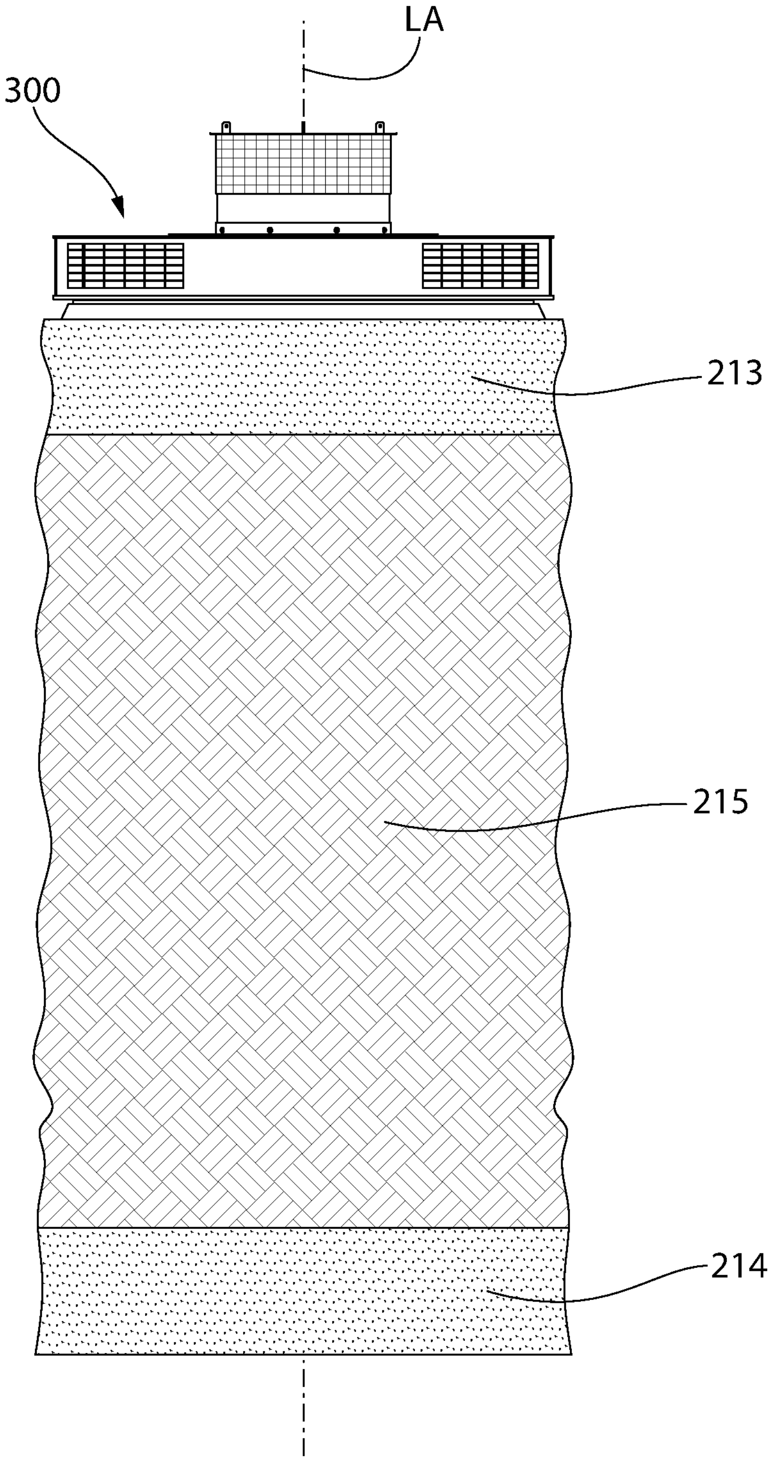
FIG. 17 is a side view thereof.
Figure 18:
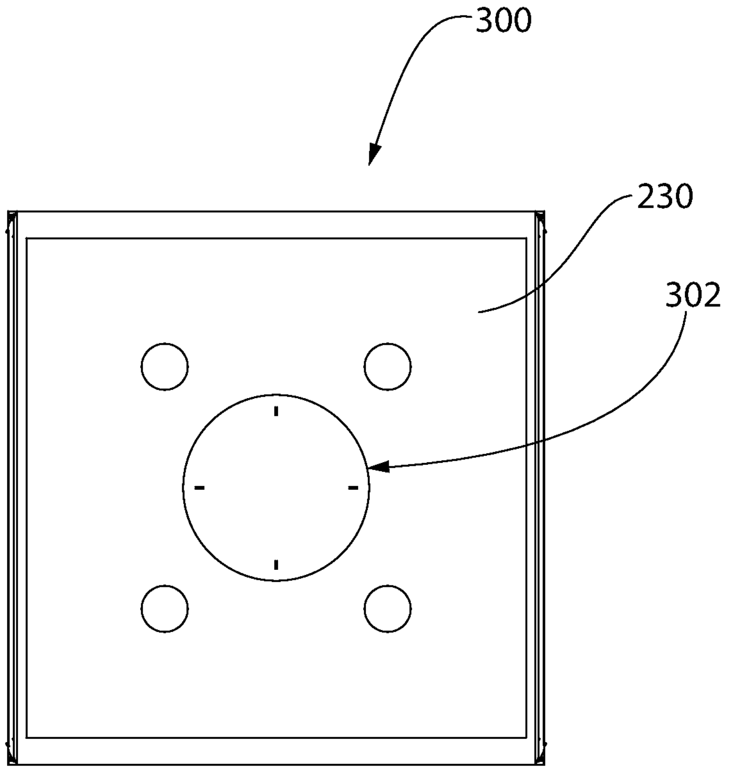
FIG. 18 is a top view thereof.
Figure 19:
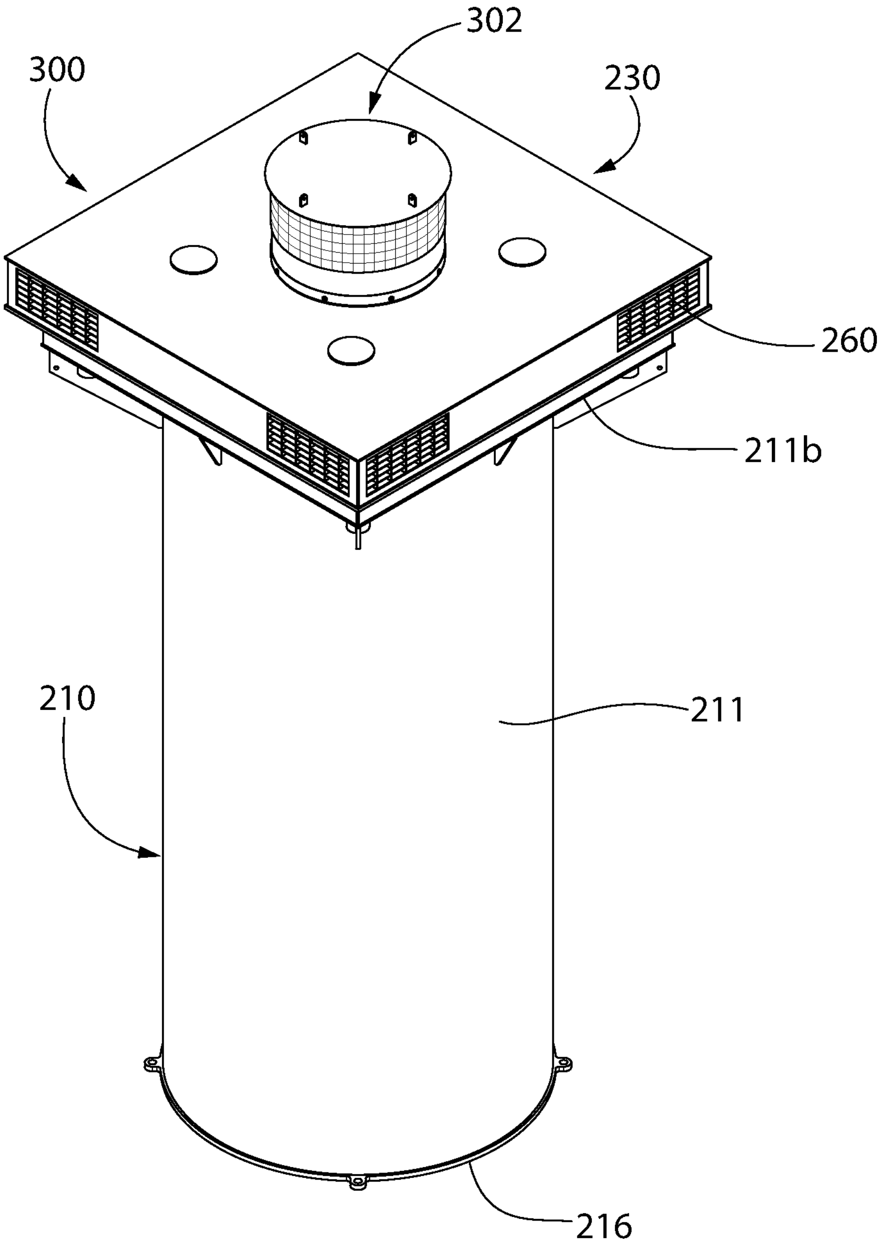
FIG. 19 is a top perspective view of the cask alone without embedment materials.
Figure 20:
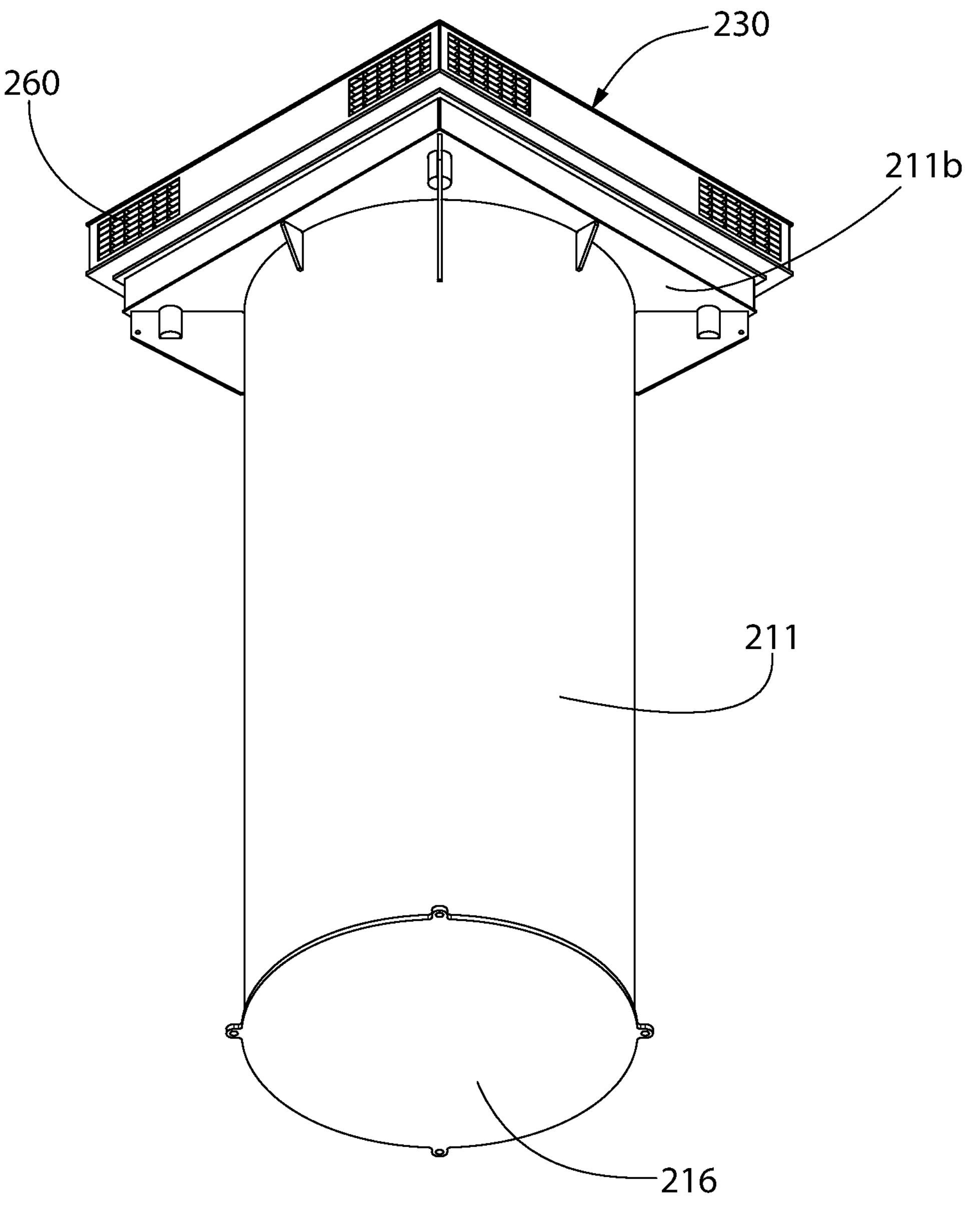
FIG. 20 is a bottom perspective view thereof.
Figure 21:
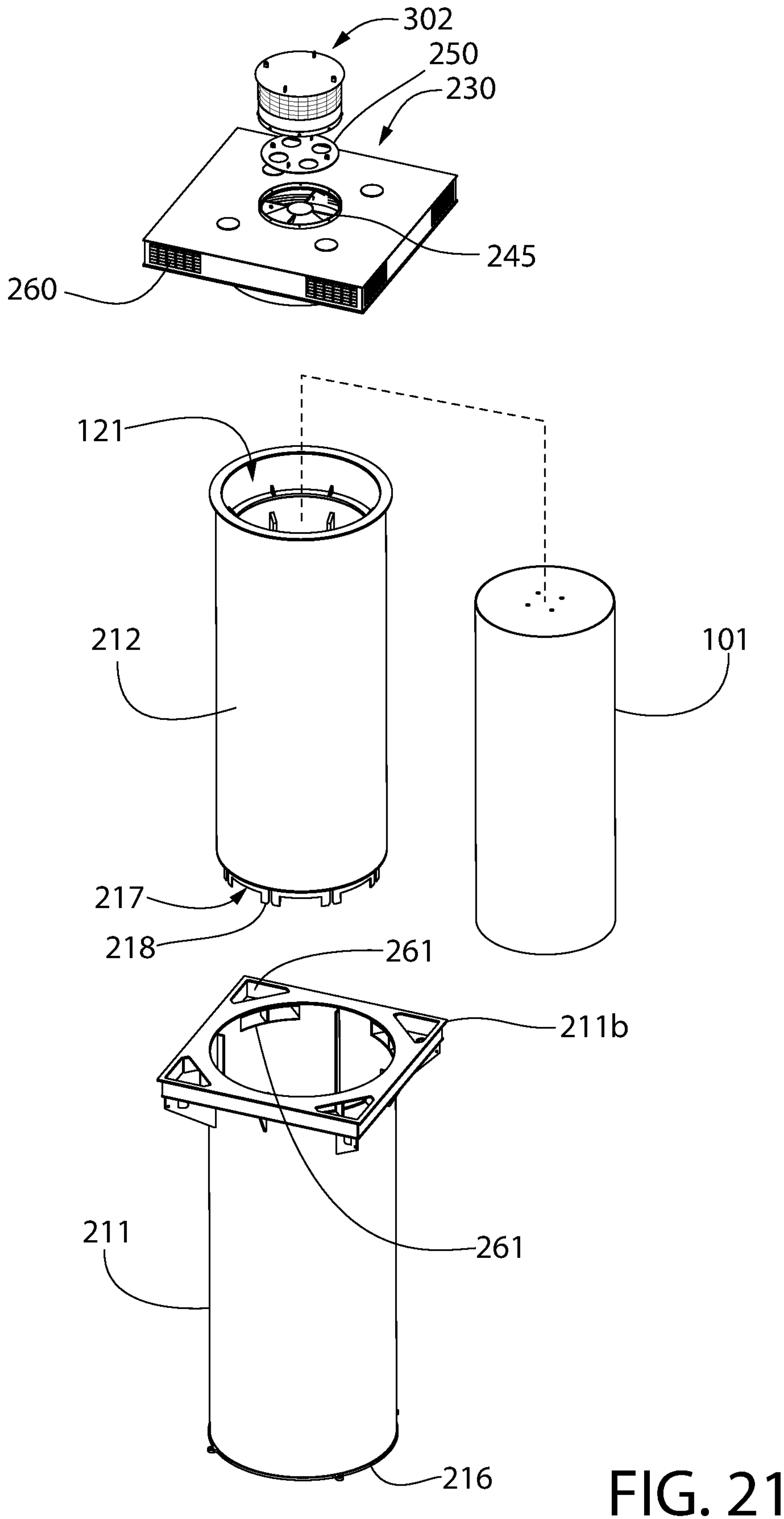
FIG. 21 is an exploded view thereof.
Figure 22:
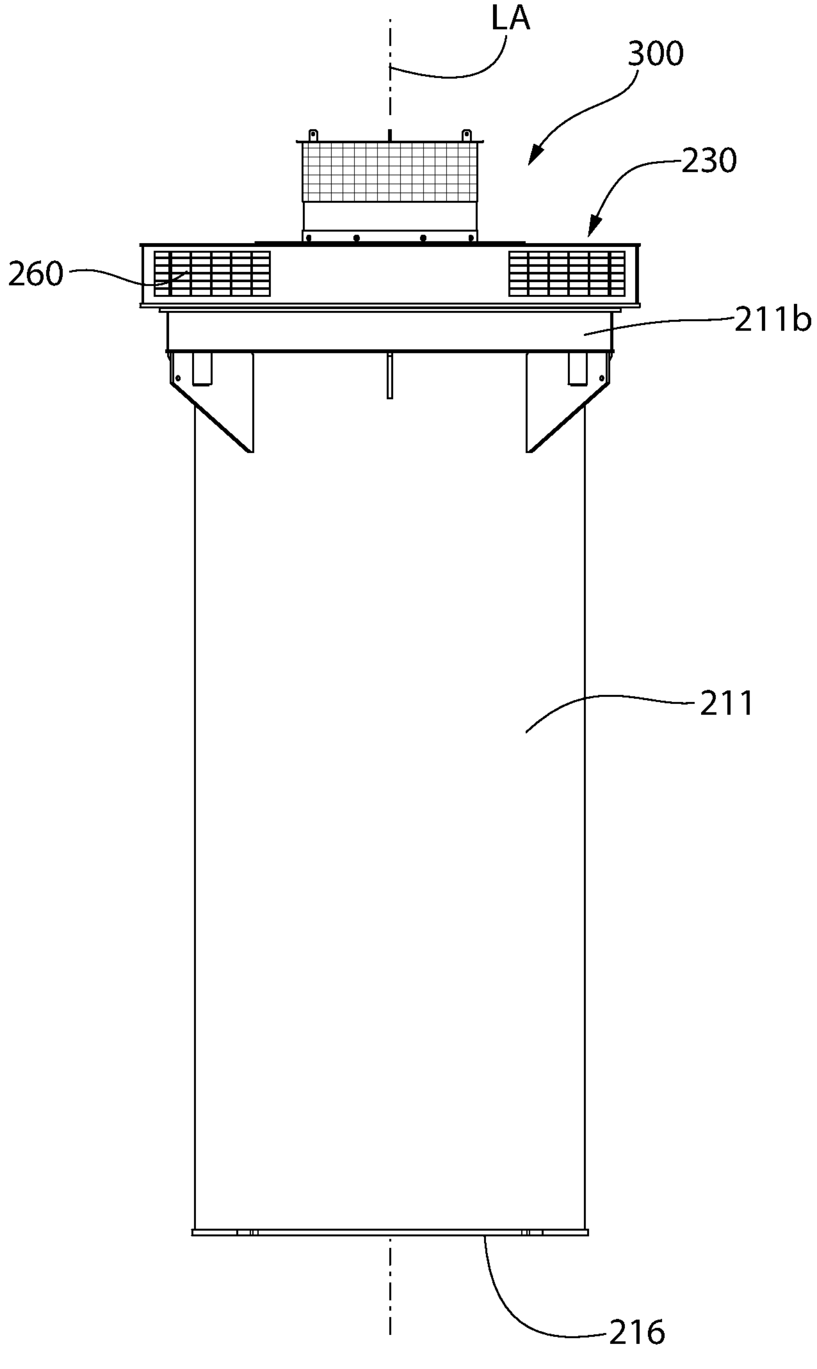
FIG. 22 is a side view thereof.
Figure 23:
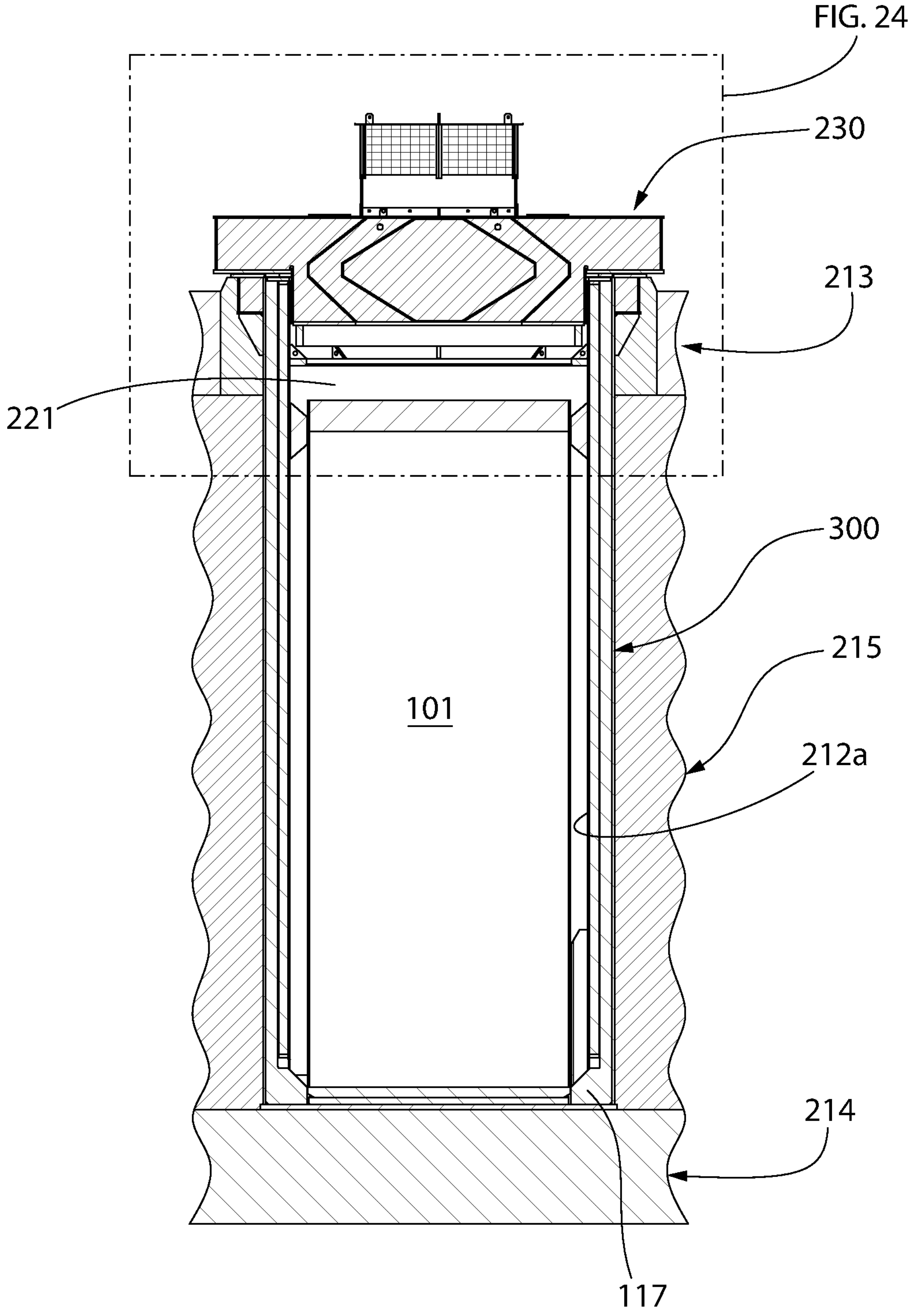
FIG. 23 is a first side cross-sectional view thereof showing the embedment materials.
Figure 24:
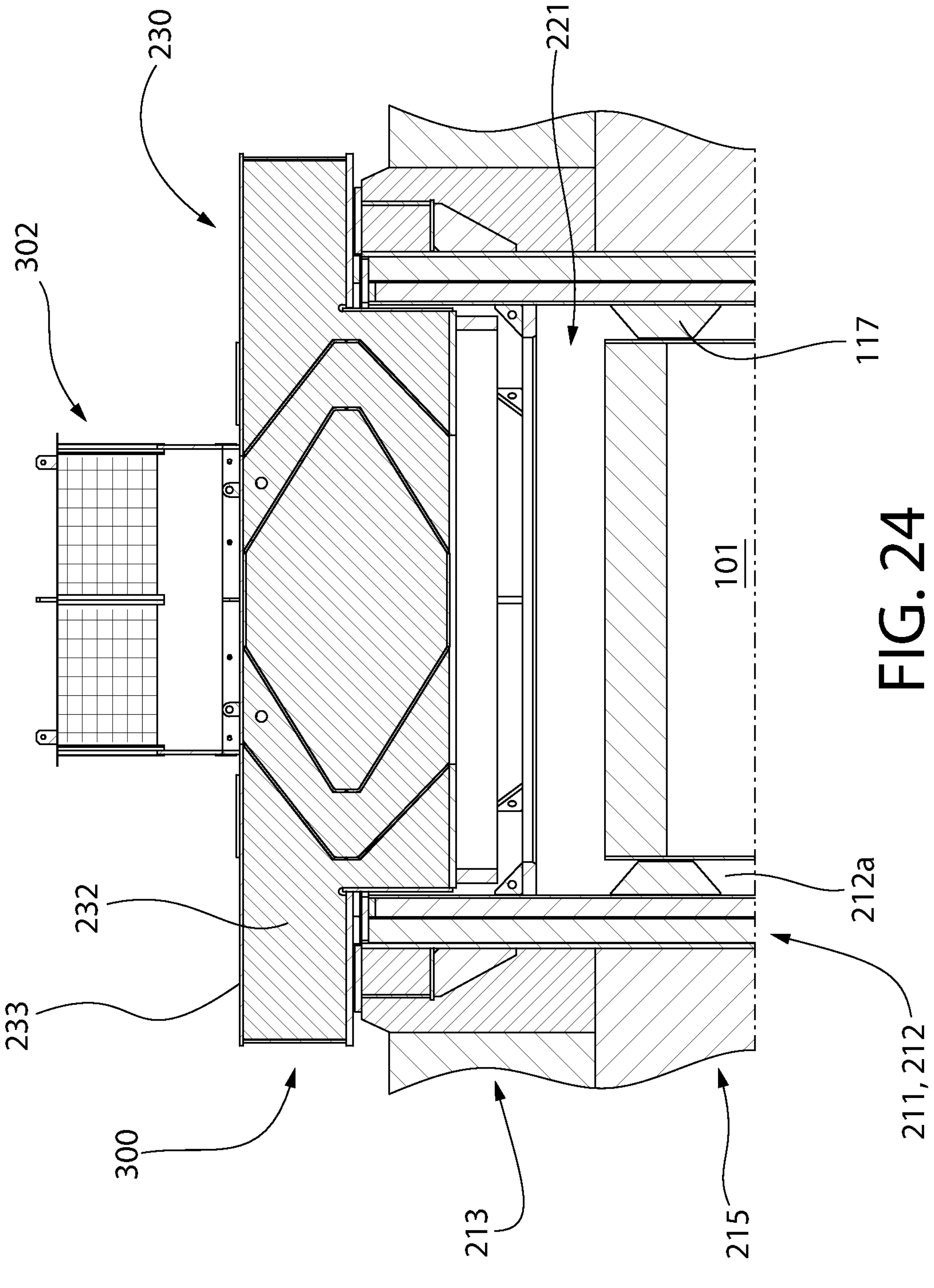
FIG. 24 is an enlarged detail therefrom.
Figure 25:
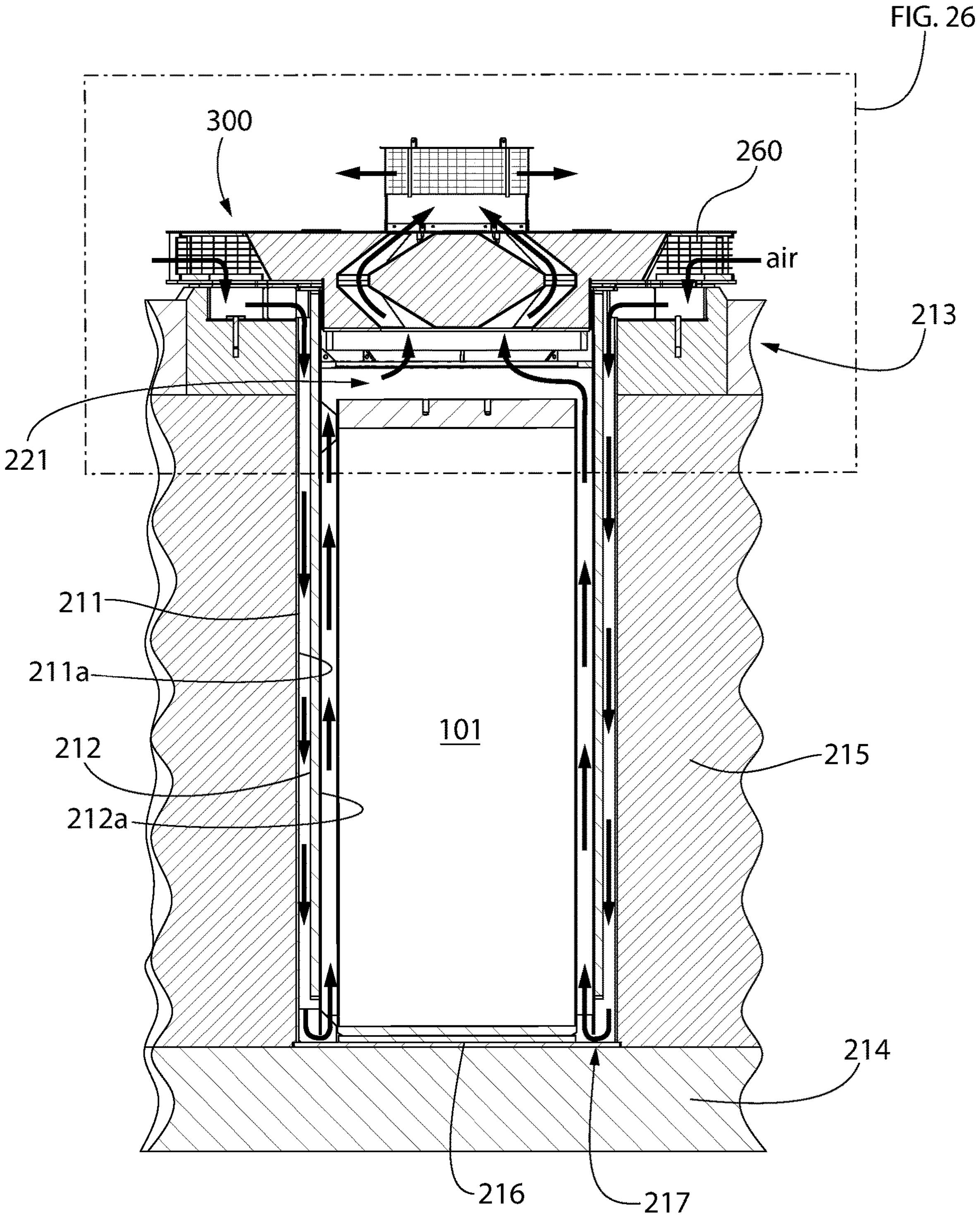
FIG. 25 is a second side cross-sectional view thereof showing the embedment materials and outlet air duct and air inlet ducts of the lid.

As shown in FIGS. 16-17 and 25 for example, the cask body 210 comprising outer and inner shells 211, 213 is configured for mounting a majority of the cask body and its vertical length/height below grade to take advantage of the radiation shielding effect of the embedment materials 213-215 previously described herein. This also advantageously creates a low profile below grade nuclear fuel storage system where only primarily the lid 230 is exposed. The below grade placement makes the storage system offers greater protection of the spent nuclear fuel canister 101 less susceptible to projectile impact scenarios. In all embodiments, at least the SNF canister 101 is located below grade when positioned in cask 300 (see, e.g. FIGS. 23 and 25).

Figure 26:
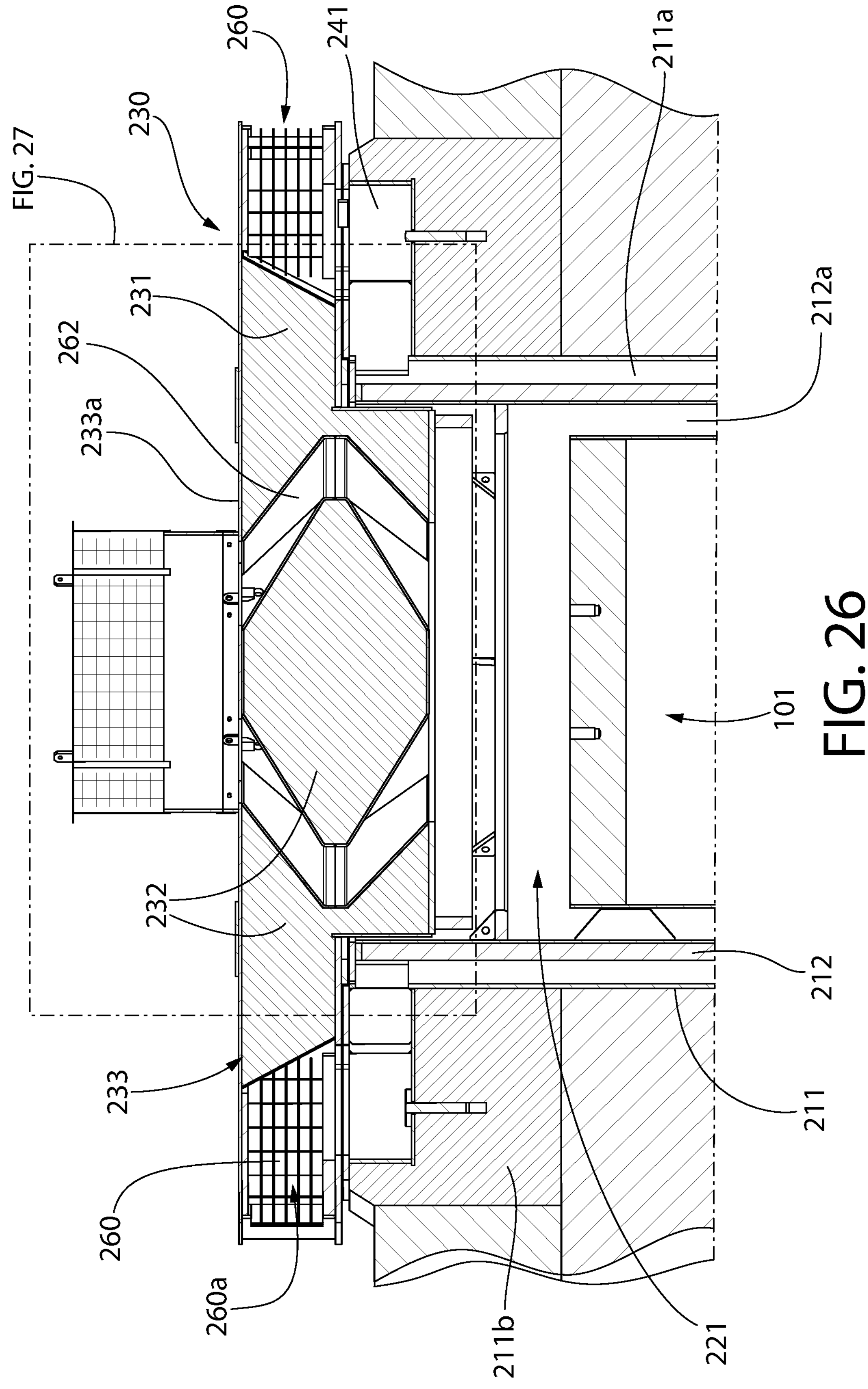
FIG. 26 is an enlarged detail therefrom.
Figure 27:
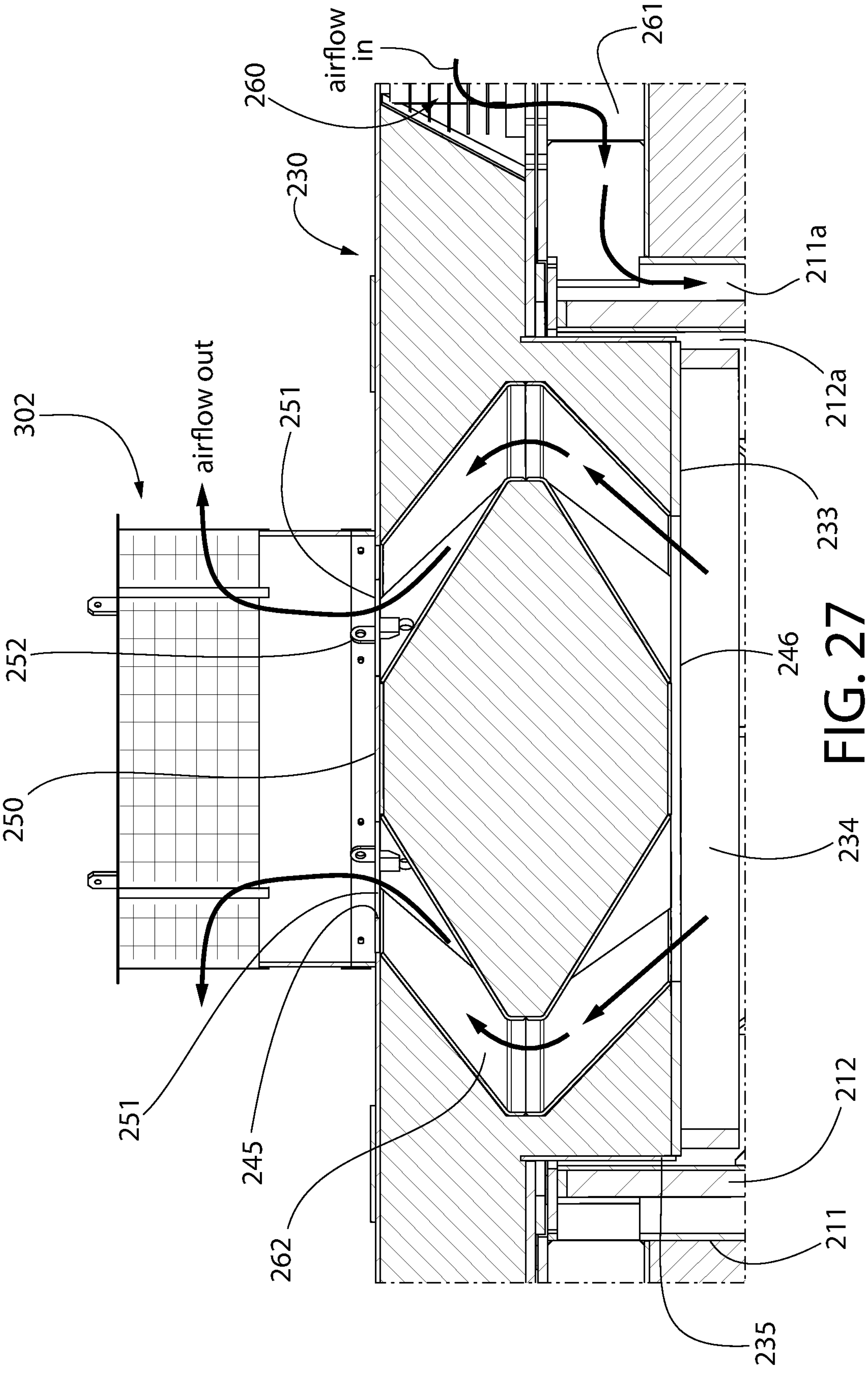
FIG. 27 is an enlarged detail therefrom.

Lid 230 is configured for mounting on top of inner shell 212 which may extend vertically upwards farther than outer shell 211 (see, e.g. FIGS. 25-27). Referring generally as applicable to FIGS. 16-31, lid 230 is a radiation shielded component comprising a metallic outer housing 233 (e.g., steel or other) comprising a top housing plate 233*a*, bottom housing plate 233*c*, and housing sidewall plate 233*b* extending perimetrically around the lid between the top and bottom housing plates. A concrete or fill liner 233 is formed inside the lid housing.

In one embodiment, the lid housing 233 may have a polygonal configuration such as rectangular (e.g., rectangular cuboid which by definition includes sides of equal or unequal length) as shown. In other embodiments, non-polygonal shapes such as cylindrical may be used. Lid 230 preferably projects laterally/horizontally farther outwards beyond outer shell 211 by a substantial distance (e.g., at least 20% of the diameter of the outer shell) on all sides of the lid. The projected distance allows air inlet ductwork to be incorporated directly into the lid without compromising the lateral extent and depth of radiation shielding material in the lid. The projection further provides space for incorporating the air outlet ducts directly into the lid. Accordingly, the ambient cooling ventilation air both enters and exits the cask 300 through lid 230.

Accordingly, lid 230 includes an array and plurality of air inlet ducts 260 for drawing ambient cooling air directly through the lid to the cask 300. In one embodiment, an inlet duct 260 may be formed at each of four corner regions of the lid and open laterally/horizontal outwards through housing sidewall plate 233*b* (see, e.g. FIG. 31). The lateral outward entrance openings of the inlet ducts are located horizontally outwards beyond outer shell 211 of cask 300 as shown. The entrance openings are shown fitted with perforated screens 260*a* to prevent foreign objects and debris from entering and obscuring the inlet ducts.

Inlet ducts 260 are downwardly open through openings formed in housing bottom plate 233*c*. Housing 233 is mated to complementary configured lid mounting flange 211*b* fixedly disposed on the top end of cask outer shell 211 (see, e.g. FIGS. 21 and 25-27). In the non-limiting illustrated embodiment, both lid housing 233 and mounting flange 211*b* may have a rectangular configuration (e.g., rectangular cuboid). Mounting flange 211*b* protrudes laterally/horizontal outwards beyond the outer surface of outer shell 211 as shown in a cantilevered manner.

The lid mounting flange 211*b* of outer shell 211 includes a plurality of air inlet passageways 261 which coincide in location and general shape to the air inlet ducts 260 of lid 230 (e.g., one each in the four corner regions of the lid and mounting flange). The passageways 261 are upwardly open at top and radially inwards opens through the upper portion of outer shell 211 for introducing ambient cooling air into the ventilation downcomer 211*a*. Each passageway 261 is in fluid communication at top with one of the air inlet ducts 260 of the lid, and at bottom with the downcomer.

Lid 230 further includes an air outlet duct 262 extending vertically through the concrete liner 232 between the housing top and bottom plates 233*a* and 233*c*. In one embodiment, the outlet duct extends vertically through a central portion of the lid as shown. Air outlet duct has a non-linear and curved shaped configured to eliminate any straight line of sight vertically through the lid to prevent radiation streaming. Air outlet duct 262 may comprise a plurality of curved branches of similar shape extending vertically through the lid and being configured such that there is no straight line of sight from the internal cavity of the cask to ambient atmosphere through the air outlet duct. The branches thus configured may be recurvant in shape.

In one embodiment, lid 230 comprises a cylindrical central plug extension 235 which projects vertically downwards from housing bottom plate 233*a* best shown in FIGS. 25-27 and 30. Plug extension 235 has a diameter sized to be received inside the top opening of cask inner shell 212. A large circular downwardly open recess 234 is defined by plug extension 235 which is in fluid communication with the upper portion of cask cavity 221 at bottom and the air outlet duct 262 at top via lower circular air inlet opening 246 in the bottom of the lid 230 (see, e.g. FIGS. 27 and 31). Opening 246 may be formed in the center of plug extension 235 in some embodiments.

An upper circular air outlet opening 245 in lid 230 is formed in the center of housing top plate 233*a*. Opening 245 is in fluid communication with the top of air outlet duct 262 in lid 230. Outlet opening 245 is covered and protected from the elements and environment by a hollow/tubular top weather protection cap structure 302 which forms an outlet vent extension. Cap structure 302 may comprise a vertical cylindrical sidewall 303 fitted with a perforated vent screen 306 and preferably solid top cover plate 304 to prevent the direct ingress of rain. Vent screen 306 may have an open area of approximately 50% in one non-limiting embodiment. An open interior 305 is defined inside cap structure 302 which is in fluid communication at bottom with the air outlet opening 245 in the lid and laterally to ambient atmosphere through the vent screen 306.

In one embodiment, the circular air outlet opening 245 is fitted with a circular metallic flow restrictor which may comprises an orifice plate 250 to control the amount of ambient cooling air which can be drawn into below grade cask 300 via air inlet ducts 260 by the natural convective thermo-siphon effect previously described herein when the air in cask cavity 221 is heated by the SNF canister 101. By restricting the outflow of heated cooling air from the cask internal cavity 221 at top, the amount of cooling air entering the air inlet ducts 260 is concomitantly restricted to maintain the desired air temperature inside the cask to prevent the onset of stress corrosion cracking (SCC) of the SNF canister welds as previously described herein.

Figure 28:
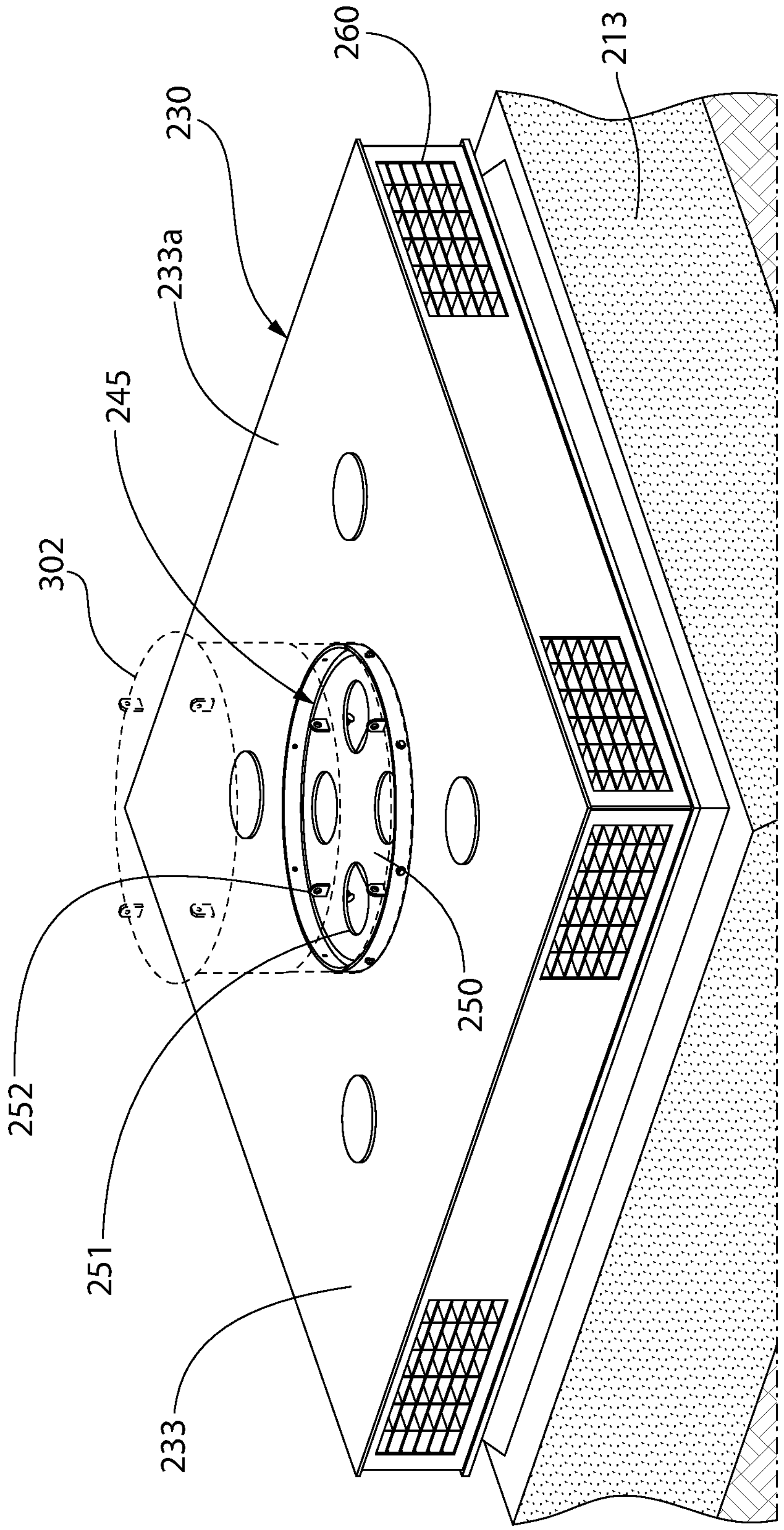
FIG. 28 is a top perspective view of the embedded cask showing the exposed lid which remains above grade and a flow restrictor comprising an orifice plate at the outlet opening of the air outlet duct in the lid.
Figure 29:
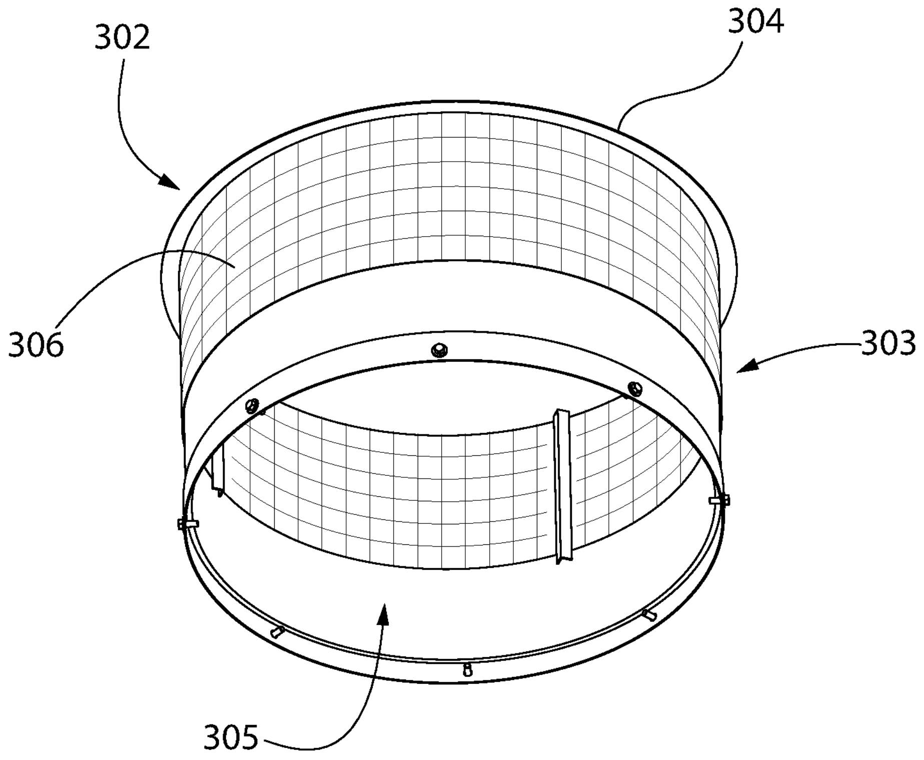
FIG. 29 is a bottom perspective view of the weather protection cap structure of the lid.

Orifice plate 250 may be fixedly attached to the lid top cover plate 233*a* at the annular edge of air outlet opening 245 of outlet duct 262 via welding. In other possible constructions, orifice plate 250 may be detachably bolted to housing top plate 233*a* via threaded fasteners. Orifice plate 250 may include a plurality of lifting lugs on its top surface to facilitate maneuvering the plate into position on lid 230. Orifice plate 250 may have a representative diameter of about 45 inches in one non-limiting example and thickness of about 1-½ inches or less, and preferably 1 inch or less. Plate 250 preferably may be made of a corrosion resistant metal such as stainless steel or another suitable metal. A plurality of lifting lugs 252 configured for rigging may be welded to the top surface of orifice plate 250 (FIGS. 27-28).

In one embodiment, orifice plate 250 may comprise an array or plurality of orifice holes 251 which may be of circular configuration in one design. Four large spaced apart orifice holes may be provided in one non-limiting embodiment, recognizing that more or less holes and different diameter holes than shown may be used. The orifice holes 251 may each have the same diameter or have different diameters. In some embodiments, contemplated, a mix of small diameter and larger diameter holes may be used.

Orifice holes 251 of orifice plate 250 are configured in number, size, and shape to provide a cumulative open area which leaves solid material or ligaments between holes that provides the desired resistance to the flow of ventilation air from the outlet duct 262 of cask 300. This regulates the flowrate (CFM) of air through the cask necessary to balance cooling the SNF canister 101 while retaining enough heat in the internal cask cavity 121 to prevent the onset of stress corrosion cracking (SCC) of the canister welds. In operation, orifice plate 250 is thus configured to create a resistance to air flow through the air outlet duct 262 of the lid 230, which in turn creates backpressure on the cask cavity 221 and in turn the air inlet ducts 260 via intervening annular downcomer 11*a* to reduce the amount of ambient air which can be drawn through the internal cavity of the cask via natural convective circulation when the cavity is heated by the SNF canister 101.

Figure 30:
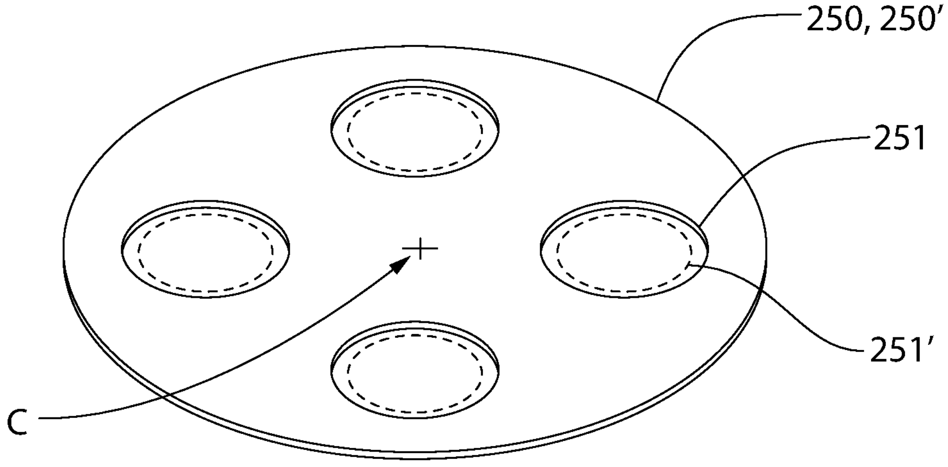
FIG. 30 is a bottom perspective view of the lid cover structure.
Figure 31:
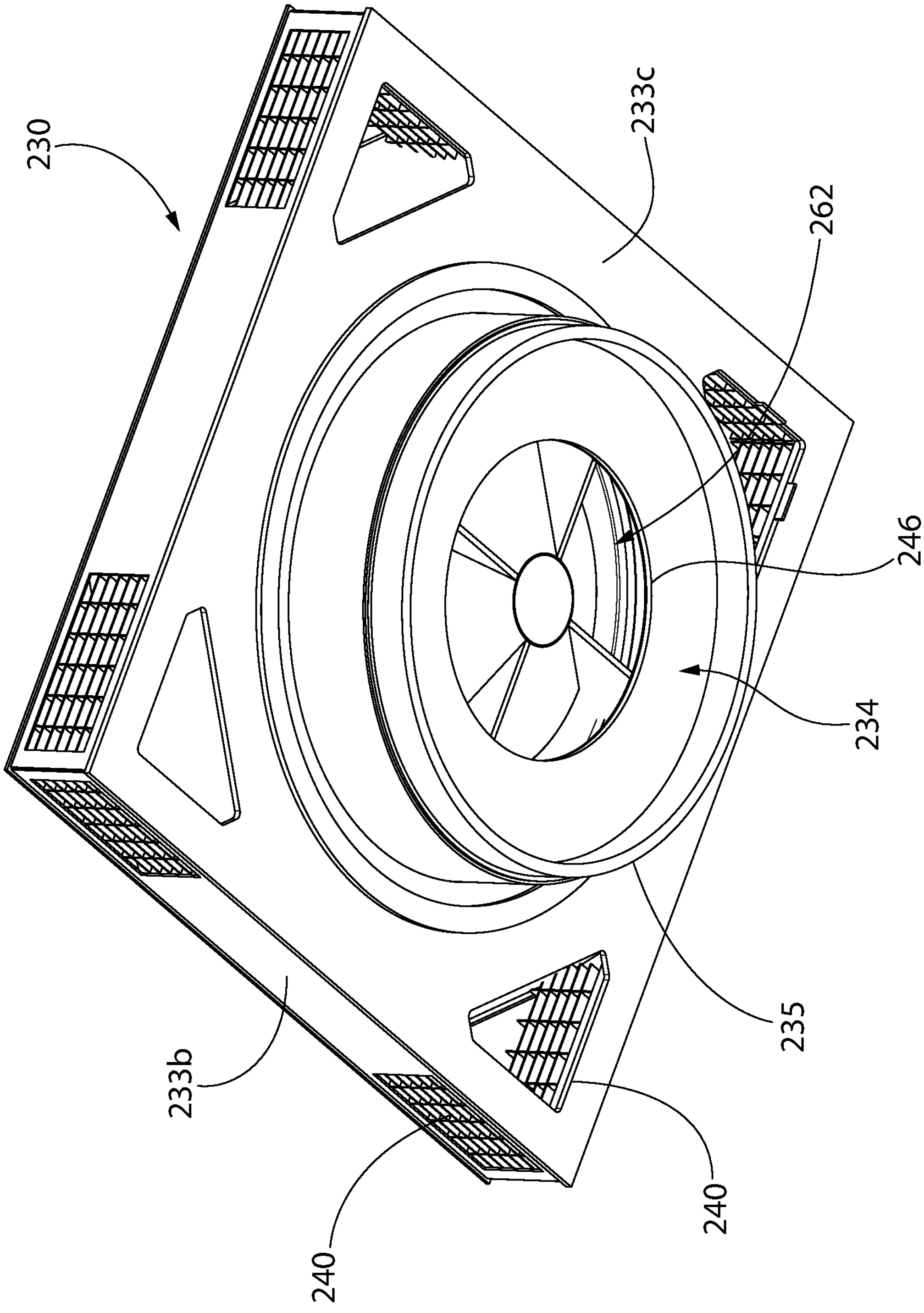
FIG. 31 is a top perspective view of the flow restrictor.

In one example arrangement shown in FIG. 30, an array of circular orifice holes 251 is provided around center C of the orifice plate 250 such that no holes are located at the center. In other possible embodiments, one hole may be provided at the center. In other possible embodiments, a single large orifice hole may be provided. In yet other possible embodiments, the orifice plate comprises a plurality of perforations with ligaments between adjacent holes which are shorter than a diameter of the holes and which perforations substantially cover an entire surface area of the plate in a uniform pattern. The term “substantially” as used here means that a narrow annular band of solid material may be provided at periphery of the plate for welding to the lid 230.

In order to maintain the foregoing balance during the service life of cask 300, as previously described, the cooling ventilation air flowrate will need to be changed over time as the heat emitted from the canister decreases as the SNF decays.

Accordingly, an ambient cooling air cask ventilation system in one embodiment comprises a plurality of orifice plates 250 each configured to provide a different resistance to airflow. As an example, a first orifice plate may have orifice holes 251 configured and sized to provide a cumulative open area which is greater a cumulative open area provided by a second orifice plate having the same number but smaller orifice holes 251' (illustrated in FIG. 29). The second orifice plate is interchangeably mountable to lid 230 with the first orifice plate such that one orifice plate may be swapped out for another.

Due to the greater amount of heat emitted by the SNF canister 101 when first loaded with spent nuclear fuel assemblies removed from the reactor or short term interim storage in the spent fuel pool, the first orifice plate 250 may be used for an initial period of time. At some point in time as the canister heat emission rate decreases with age, the first orifice plate may be replaced with the second orifice plate 250' (FIG. 29) having a smaller cumulative open area for subsequent second period of time to maintain a desired minimum air temperature inside the cask 300. Because the relative humidity of air decreases with increasing temperature, maintaining the minimum cooling air temperature in cask cavity 221 which is associated with lower relative humidity advantageously is detrimental to the onset of SCC which occurs in high humidity environments in the presence of halides (salts) such as in marine nuclear fuel storage sites.

A method for operating a passively ventilated below grade nuclear fuel storage system may be summarized as comprising: inserting a canister 101 containing spent nuclear fuel in an internal cavity 221 of a cask 300; attaching a lid 230 on the cask, the lid comprising an air outlet duct 262 including a first orifice plate 250 having a first open area, the outlet duct in fluid communication with the internal cavity of the cask; storing the canister in the cask for a first period of time; removing the first orifice plate from the lid; and installing a second orifice plate 250' in the lid for a second period of time, the second orifice plate having a second open area different than the first open area.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A passively ventilated nuclear fuel storage cask comprising:

an elongated cask body defining a top end, a bottom end, a sidewall, and an internal cavity extending between the ends along a longitudinal axis, the internal cavity being configured for holding a nuclear fuel storage canister;

a plurality of cooling air inlet ducts spaced circumferentially apart around the body, the inlet ducts each forming a radial air inlet passageway fluidly coupling ambient atmosphere with a lower portion of the internal cavity;

at least one cooling air outlet ducts disposed at the top end of the cask body, the at least one outlet duct forming an air outlet passageway fluidly connecting ambient atmosphere with an upper portion of the internal cavity; and a vertically adjustable shutter plate coupled to each the air inlet ducts, the shutter plate defining a flow opening area configured to throttle an inflow of cooling air through the internal cavity of the cask;

wherein each air inlet duct comprises a rectangular inlet flow box disposed on the baseplate and extending radially through the sidewall of the cask body to fluidly connect ambient air to the internal cavity of the cask;

wherein the shutter plate is slideably mounted to an outward facing flat face frame of the inlet ow box; and wherein each shutter plate comprises a flat plate body.

2. The cask according to claim 1, wherein the shutter plates are vertically adjustable in position on the cask to vary the flow opening area to increase or decrease the inflow of cooling air.

3. The cask according to claim 2, wherein shutter plates are vertically movable between a first position associated with a first flow opening area, and a second position associated with a second flow opening area larger than the first open area.

4. The cask according to claim 2, wherein the first position is a lower position and the second position is an upper position.

5. The cask according to claim 2, wherein the flow opening area is defined between a bottom edge of the shutter plate and the bottom end of the cask body.

6. The cask according to claim 5, wherein the bottom end of the cask body is defined by a bottom surface of a baseplate configured to anchor the cask to a support surface.

7. The cask according to claim 6, wherein the bottom edge of shutter plate is engageable with a top surface of the baseplate which defines a travel stop that sets a minimum flow opening area.

8. The cask according to claim 7, wherein the baseplate comprises a cutout at each of the inlet ducts forming a discontinuous circumference of the baseplate.

9. The cask according to claim 1, wherein each air inlet duct comprises a gamma shield formed by an orthogonal grid array of shielding plates, the shielding plates extending radially from the external surface to the internal surface of the sidewall inside the inlet flow box.

10. The cask according to claim 1, wherein the shutter plates each include a vertical adjustment slot and a locking fastener extending through the slot and threadably engaging the face frame, the locking fastener loosenable to adjust the position of the shutter plate and tightenable to fix the shutter plate in position.

11. The cask according to claim 1, wherein the inlet flow box is welded to the baseplate.

12. The cask according to claim 11, wherein the inlet flow box is a three-sided inverted U-shaped orthogonal structure formed of steel plates welded together.

* * * * *